(12) United States Patent
Ma et al.

(10) Patent No.: US 9,313,020 B2
(45) Date of Patent: Apr. 12, 2016

(54) HANDSHAKING PROTOCOL FOR TIME-REVERSAL SYSTEM

(71) Applicant: ORIGIN WIRELESS, INC., Boston, MA (US)

(72) Inventors: Hang Ma, Greenbelt, MD (US); Yi Han, Greenbelt, MD (US); Yan Chen, Greenbelt, MD (US); Zoltan Safar, Ellicott City, MD (US); Feng Han, Baltimore, MD (US); K. J. Ray Liu, Potomac, MD (US)

(73) Assignee: Origin Wireless, Inc., Boston, MA (US)

( * ) Notice: Subject to any disclaimer, the term of this patent is extended or adjusted under 35 U.S.C. 154(b) by 189 days.

(21) Appl. No.: 14/183,648

(22) Filed: Feb. 19, 2014

(65) Prior Publication Data

US 2015/0236848 A1    Aug. 20, 2015

(51) Int. Cl.
*H04L 7/04* (2006.01)
*H04W 56/00* (2009.01)

(52) U.S. Cl.
CPC ............. *H04L 7/042* (2013.01); *H04W 56/001* (2013.01)

(58) Field of Classification Search
CPC ....................................................... H04L 7/042
USPC ......................................................... 370/328
See application file for complete search history.

(56) References Cited

U.S. PATENT DOCUMENTS

| 2,933,702 A | 4/1960 | Bogert |
| 3,767,855 A | 10/1973 | Ueno et al. |
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |

(Continued)

FOREIGN PATENT DOCUMENTS

| EP | 2 571 214 A1 | 11/2012 |
| WO | WO 2007/031088 | 3/2007 |

(Continued)

OTHER PUBLICATIONS

Goldsmith, A., "Wireless Communications," Cambridge University Press, Chapter 3, pp. 63-92 (2005).

(Continued)

*Primary Examiner* — Hassan Phillips
*Assistant Examiner* — Omeed D Rahgozar
(74) *Attorney, Agent, or Firm* — Fish & Richardson P.C.

(57) ABSTRACT

A handshaking process for time-reversal wireless communication is provided. A first device receives a handshake signal transmitted from a second device through multiple propagation paths, the handshake signal including a preamble and a training sequence, in which the training sequence includes a sequence of symbols known to the first and second devices. A synchronization index is determined based on the preamble, and the training sequence in the handshake signal is identified based on the synchronization index. A channel response signal is determined based on the received training sequence, and a signature waveform that is a time-reversed signal of the channel response signal is generated. A transmission signal is generated based on transmit data and the signature waveform, in which the transmit data are data configured to be transmitted to the second device.

24 Claims, 25 Drawing Sheets

(56) References Cited

U.S. PATENT DOCUMENTS

| | | |
|---|---|---|
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |
| 8,457,217 B2 | 6/2013 | Huy et al. |
| 8,498,658 B2 | 7/2013 | Smith et al. |
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 2003/0138053 A1 | 7/2003 | Candy et al. |
| 2004/0156443 A1 | 8/2004 | Dent |
| 2006/0098746 A1 | 5/2006 | Candy et al. |
| 2006/0115031 A1 | 6/2006 | Lindskog et al. |
| 2010/0302977 A1 | 12/2010 | Huy et al. |
| 2010/0309829 A1 | 12/2010 | Huy et al. |
| 2012/0155515 A1 | 6/2012 | Smith et al. |
| 2012/0183037 A1 | 7/2012 | Allpress et al. |
| 2012/0207234 A1 | 8/2012 | de Rosny et al. |
| 2012/0257660 A1 | 10/2012 | Smith et al. |
| 2012/0263056 A1 | 10/2012 | Smith et al. |
| 2012/0328037 A1 | 12/2012 | Hsu et al. |
| 2013/0201958 A1 | 8/2013 | Huy et al. |
| 2013/0223503 A1 | 8/2013 | Smith et al. |
| 2014/0022128 A1 | 1/2014 | Smith |
| 2014/0126567 A1 | 5/2014 | Husain et al. |
| 2014/0185596 A1 | 7/2014 | Han et al. |
| 2015/0049745 A1 | 2/2015 | Han et al. |
| 2015/0049792 A1 | 2/2015 | Han et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Han, F. et al., "Time-Reversal Division Multiple Access in Multi-path Channels," IEEE Transactions On Communications, vol. 60:1953-1965 (2012).

Wang, B. et al., "Green Wireless Communications: A Time-Reversal Paradigm," IEEE Journal on Selected Areas In Communications, vol. 29:1698-1710 (2011).

Abbasi-Moghadam, D. and V.T. Vakili, "A SIMO one-bit time reversal for UWB communication systems", EURASIP J. Wireless Comm. and Networking, 2012:113, 2012.

Albert, D., L. Liu, M. L. Moran, "Time Reversal processing for source location in an urban environment (L)", J. Acoust. Soc. Am., vol. 118, No. 2, pp. 616-619, Aug. 2005.

Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels, R.C. and R. W. Heath, "MISO precoding for temporal and spatial focusing" in the Proceedings of the Eighth International Symposium on Wireless Personal Communications Conference, Aalborg, Denmark, 2005.

Daniels et al., "Improving on Time-reversal with MISO Precoding," Proceedings of the Eighth International Symposium on Wireless Personal Communications Conference, Aalborg, Denmark, 5 pages, 2005.

de Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Left., vol. 90, No. 1, 014301, Jan. 2003.

Derode, A., P. Roux, and M. Fink, "Robust Acoustic Time Reversal and High-Order Multiple Scattering", Phys. Rev. Left., vol. 75, No. 23, pp. 4206-4210, Dec. 1995.

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

Edelmann, G.F., Akal, T., Hodgkiss, W. S., Kim, S., Kuperman, W. A., Song, H. C., "An Initial Demonstration of Underwater Acoustic Communication Using Time Reversal", IEEE Journal of Oceanic Engineering, vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.

Fink, M. and C. Prada, "Acoustic Time-Reversal Mirrors", Inverse Problems, vol. 17, pp. R1-R38, 2001.

Fink, M., "Time Reversal of Ultrasonic Fields-Part I: Basic Principals", IEEE Trans. Ultrasonics, Ferroelectrics and Freq. Contr., vol. 39, No. 5, pp. 555-566, Sep. 1992.

Fink, M., "Time-Reversed Acoustics", Scientific American, pp. 91-97, Nov. 1999.

Fink, M., "Time-Reversal Mirrors", J. Phys. D: Appl. Phys., vol. 26, pp. 1333-1350, 1993.

Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.

Fontana, R.J., S.J. Gunderson, "Ultra-Wideband Precision Asset Location System", Proc. of the IEEE Conf. on UWB Sys. And Tech., pp. 147-150, 2002.

Guo, N., B.M. Sadler and R.C. Qiu, "Reduced-Complexity UWB Time-Reversal Techniques and Experimental Results", IEEE Trans. On Wireless Comm., vol. 6, No. 12, Dec. 2007.

Han, F. and K.J.R. Liu, "An Interference Cancellation Scheme for the Multiuser TRDMA Uplink System," Global Telecommunications Conference, pp. 3583-3588 (2013).

Han, F., "Energy Efficient Optimization in Green Wireless Networks", University of Maryland Ph. D. Dissertation, 2013.

Han, F., Y.H. Yang, B. Wang, Y. Wu, K.J.R. Liu, "Time-reversal division multiple access in multi-path channels," Global Telecommunications Conference, pp. 1-5 (2011).

Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).

Han, F., Yang, Y.-H., Wang, B., Wu, Y., Liu, K.J.R., "Time-reversal division multiple access in multi-path channels", IEEE Globecom, Houston, Dec. 2011.

Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.

Han, F. and K.J.R. Liu, "A multiuser TRDMA uplink system with 2D parallel interference cancellation," IEEE Transactions on Communications, vol. 62(3):1011-1022, Mar. 2014.

(56) References Cited

OTHER PUBLICATIONS

Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.

Jin, Y., Moura, J., "Time-Reversal Detection Using Antenna Arrays", IEEE Trans. Signal Processing, vol. 57(4):1396-1414, Apr. 2009.

Jin, Yuanwei et al., "Adaptive time reversal beamforming in dense multipath communication networks," 2008 42nd Asilomar Conference on Signals, Systems and Computers, pp. 2027-2031 (Oct. 2008).

Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.

Kuperman, W.A., W.S. Hodgkiss, H.C. Song, T. Akal, C. Ferla, D.R. Jackson, "Phase conjugation in the ocean: Experimental demonstration of an acoustic time-reversal mirror", J. Acoust. Soc. Am., vol. 103, No. 1, pp. 25-40, Jan. 1998.

Kyritsi, P. and G. Papanicolau, "One-bit Time Reversal for WLAN Applications", IEEE $16^{th}$ Intern. Symp. On Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301 (2005).

Kyritsi, P. et al., "Time reversal techniques for wireless communications," IEEE Vehicular Technology Conference, vol. 1:47-51 (2004).

Lemoult, F., G. Lerosey, J. de Rosny, and M. Fink, "Manipulating Spatiotemporal Degrees of Freedom in Waves of Random Media", Phys. Rev. Left., vol. 103, 173902, Oct. 2009.

Lemoult, F., G. Lerosey, J. de Rosny, and M. Fink, "Resonant Metalenses for Breaking the Diffraction Barrier", Phys. Rev. Lett., vol. 104, 203901, May 2010.

Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.

Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May, 2004.

Lerosey, G., J. de Rosny, A. Tourin, A. Derode, M. Fink, "Time Reversal of Wideband Microwaves", Appl. Phys. Lett., vol. 88, 154101, Apr. 2006.

Lerosey, G., J. de Rosny, A. Tourin, and M. Fink, "Focusing beyond the diffraction limit with far-field time reversal", Science, vol. 315, pp. 1120-1122, Feb. 2007.

Lienard, M. et al., "Focusing gain model of time-reversed signals in dense multipath channels," IEEE Antennas and Wireless Propagation Letters, vol. 11:1064-1067, 2012.

Ma, H., F. Han, and K.J.R. Liu, "Interference-Mitigating Broadband Secondary User Downlink System: A Time-Reversal Solution", Global Telecommunications Conference, pp. 884-889, (2013).

Montaldo, G., Lerosey, G., Derode, A., Tourin, A., de Rosny, J., Fink, M., "Telecommunication in a disordered environment with iterative time reversal", Waves Random Media, vol. 14:287-302, 2004.

Moura, J.M.F. and Y. Jin, "Detection by Time Reversal: Single Antenna", IEEE Trans. On Signal Process., vol. 55, No. 1, Jan. 2007.

Moura, J.M.F. and Y. Jin, "Time Reversal Imaging by Adaptive Interference Canceling", IEEE Trans. On Signal Process., vol. 56, No. 1, Jan. 2008.

Naqvi, I.H., A. Khaleghi and G. El Zein, "Performance Enhancement of Multiuser Time Reversal UWB Communication System", Proc. of IEEE ISWCS, pp. 567-571, 2007.

Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.

Naqvi, I.H., P. Besnier and G. El Zein, "Effects of Time Variant Channel on a Time Reversal UWB System", Global Telecommunications Conference, (2009).

Nguyen, H., F. Zheng, and T. Kaiser, "Antenna Selection for Time Reversal Mimo UWB Systems", IEEE Vehicle Technology Conference, pp. 1-5, 2009.

Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.

Nguyen, H., Z. Zhao, F. Zheng, and T. Kaiser, "Preequalizer Design for Spatial Multiplexing SIMO-UWB TR Systems", IEEE Trans. On Vehicular Tech., vol. 59, No. 8, Oct. 2010.

Nguyen, H.T., "Partial one bit time reversal for UWB impulse radio multi-user communications", IEEE Proc. of ICCE, 2008.

Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.

Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Nguyen, H. T., "On the performance of one bit time reversal for multi-user wireless communications", IEEE Proc. of ISWCS, pp. 672-676, 2007.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

Parvulescu, A. and Clay, C. S., "Reproducibility of Signal Transmissions in the Ocean", The Radio and Electronic Engineer, pp. 223-228, Apr. 1965.

Phan-Huy, D. T., S.B. Halima, M. Helard, "Frequency Division Duplex Time Reversal", Global Telecommunications Conference, (2011).

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Price, R., "A Communication Technique for Multipath Channels", Proceeding of the IRE, pp. 555-570, 1958.

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wu, Z.H., Han, Y., Chen, Y., and Liu, K.J.R., "A Time-Reversal Paradigm for Indoor Positioning System", IEEE Transactions on

(56) References Cited

OTHER PUBLICATIONS

Vehicular Technology, vol. 64(4):1331-1339, special section on Indoor localization, tracking, and mapping with heterogeneous technologies, Apr. 2015.

Wu, F., J.L. Thomas, and M. Fink, "Time Reversal of Ultrasonic Fields-Part II: Experimental Results", IEEE Trans. Ultrasonics, Ferroelectrics and Freq. Contr., vol. 39, No. 5, pp. 567-578, Sep. 1992.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, Pier 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Y-H, Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

L: delay spread of the multipath channel
g: guard band
l: pulse band $$L = l + g$$

$$T = \begin{bmatrix} S_{qe}[0] & 0 & \cdots & 0 \\ S_{qe}[1] & \ddots & & \vdots \\ \vdots & & \ddots & \\ S_q[L+L_e-1] & & & \end{bmatrix}$$

The toeplitz matrix $T$ generated by the training sequence $S_{qe}$

FIG. 12

Frame Structure of Time Reversal Packet

Data transmission phase

HANDSHAKING PROTOCOL FOR TIME-REVERSAL SYSTEM

TECHNICAL FIELD

This disclosure generally relates to handshaking protocols for time-reversal wireless systems.

BACKGROUND

A time-reversal division multiple access (TRDMA) system provides a cost-effective single-carrier technology for broadband communications and at the same time leverages the degrees of freedom in a large number of multi-paths to form a unique high-resolution spatial focusing effect. In some time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

In general, in one aspect, a method for time-reversal wireless communication includes: at a first device, receiving a handshake signal transmitted from a second device through multiple propagation paths, the handshake signal including a preamble and a training sequence, the training sequence including a sequence of symbols known to the first and second devices; determining a synchronization index based on the preamble; identifying the training sequence in the handshake signal based on the synchronization index; determining a channel response signal based on the received training sequence; generating a signature waveform that is a time-reversed signal of the channel response signal; and generating a transmission signal based on transmit data and the signature waveform, the transmit data being data configured to be transmitted to the second device.

Implementations of the method may include one or more of the following features. The handshake signal can include a first predetermined code.

The first predetermined code can include a barker code.

The handshake signal can include a second predetermined code that has an index for selecting the training sequence from among a list of training sequences.

The preamble can include pulse signals.

Determining a channel response signal can include determining a channel response signal based on a conversion matrix and the training sequence.

The conversion matrix can be constructed based on the training sequence sent by the second device.

Determining a channel response signal can include determining a channel response signal based on a least square method.

The method can include applying time windows to the received training sequence and determining an estimated channel response based on averaging the samples in the time windows.

The method can include applying time windows to the received preamble to determine the synchronization index.

The training sequence can include a first guard band, followed by an effective training sequence, which is followed by a second guard band.

Generating a signature waveform can include generating a signature waveform that is a time-reversed conjugate signal of the channel response signal.

Determining a channel response can include calculating $\widehat{CR} = Cq\ u$, in which $\widehat{CR}$ represents an estimated channel response, $Cq$ represents a conversion matrix, and u represents a portion of the received handshake signal that is estimated to be the received training sequence.

The conversion matrix $Cq$ can be determined by calculating $Cq = (T'T)^{-1}T'$, in which T is a Toeplitz matrix generated based on $s_q$, which represents an effective training sequence sent by the second device.

In general, in another aspect, a method for time-reversal wireless communication includes: at a first device, receiving a handshake signal transmitted from a second device through multiple propagation paths, the handshake signal including a sequence of codes known to the first and second devices; performing cross correlation operations on the known sequence of codes and the received handshake signal to determine cross correlation values; determining synchronization index based on the cross correlation values; determining a channel response signal based on the synchronization index and the cross correlation values; generating a signature waveform that is a time-reversed signal of the channel response signal; and generating a transmission signal based on transmit data and the signature waveform, the transmit data being data intended to be transmitted to the second device.

Implementations of the method may include one or more of the following features. Each cross correlation operation can include calculating a cross correlation of the sequence of codes and a shifted version of the received handshake signal.

The method can include determining a maximum of the cross correlation values.

The method can include determining the synchronization index of the received handshake signal such that the cross-correlation of the known sequence of codes and the received handshake signal shifted according to one or more indices is greater than the maximum of the cross-correlation values multiplied by a predetermined coefficient, the coefficient being smaller than 1, and selecting a first one of the one or more indices as the synchronization index.

Determining a channel response can include determining a channel response based on a subset of the cross-correlation values and the synchronization index.

Generating a signature waveform can include generating a signature waveform that is a time-reversed conjugate signal of the channel response.

Performing cross correlation operations can include calculating $r_{yx}(n) = \Sigma_{i=0}^{N} x(i) y(i+n)$, in which $r_{yx}(n)$ represents a correlation value, $x(i)$ represents the known sequence of codes, and $y(i+n)$ represents the received handshake signal shifted by n samples, n is an integer, and N is an integer representing a length of the known sequence of codes.

In general, in another aspect, a method for time-reversal wireless communication includes: at a first device, receiving a signal transmitted from a second device through multiple propagation paths, the received signal including a received version of a sequence of codes and data, the sequence of codes being known to both the first and second devices; performing cross-correlation operations on a known version of the sequence of codes and the received version of the sequence of codes to determine cross-correlation values; determining a synchronization index based on the cross-correlation values; and identifying the data within the received signal based on the synchronization index.

Implementations of the method may include one or more of the following features.

The sequence of codes and the data can be generated at the second device by applying a signature waveform to the sequence of codes and the sequence of data, the signature waveform being generated based on a time-reversed signal of a channel response signal.

Determining a synchronization index can include determining a maximum of the cross-correlation values, and determining the synchronization index based on the maximum of the cross-correlation values.

The method can include sending a probing signal from the first device to the second device through multiple propagation paths, the probing signal being configured to be used by the second device for determining a signature waveform that is a time-reversed signal of a channel response of the probing signal.

In general, in another aspect, a method of wireless communication between devices includes: at a first device, receiving a probe signal from a second device, the probe signal including first information and second information, the first information enabling the first device to determine a first synchronization index to identify the second information within the probe signal, the second information enabling the first device to determine a multipath channel response; generating a signature waveform based on a time-reversed signal of the multipath channel response; at the first device, applying the signature waveform to third information and fourth information to generate a transmit signal, and transmitting the transmit signal to the second device through multiple propagation paths; and at the second device, receiving the transmit signal, determining a second synchronization index based on the third information, and identifying the fourth information within the received transmit signal based on the second synchronization index.

In general, in another aspect, a method of wireless communication, the method comprising: at a base station, receiving a first probe signal from a first device, generating a first signature waveform based on the first probe signal, the first probe signal comprising synchronization information to enable the base station to determine a synchronization index for the first probe signal; receiving a second probe signal from a second device, generating a second signature waveform based on the second probe signal, the second probe signal comprising synchronization information to enable the base station to determine a synchronization index for the second probe signal; applying the first signature waveform to a first code and first data to generate first transmit data, the first data being intended for the first device, the first code configured to enable the first device to determine a synchronization index for data transmitted from the base station and intended for the first device; applying the second signature waveform to a second code and second data to generate second transmit data, the second data being intended for the second device, the second code configured to enable the second device to determine a synchronization index for data transmitted from the base station and intended for the second device; combining the first transmit data and the second transmit data to generate combined transmit data; and transmitting the combined transmit data to the first and second devices, the combined transmit data being sent to the first device through first multiple propagation paths, the combined transmit data being sent to the second device through second multiple propagation paths.

In general, in another aspect, a system for time-reversal wireless communication includes a first device that has an input circuit and a data processor. The input circuit is configured to receive a handshake signal transmitted wirelessly from a second device through multiple propagation paths, the handshake signal including a preamble and a training sequence, the training sequence including a sequence of symbols known to the first and second devices. The data processor is configured to determine a synchronization index based on the preamble; identify the training sequence in the handshake signal based on the synchronization index; determine a channel response signal based on the received training sequence; generate a signature waveform that is a time-reversed signal of the channel response signal; and generate a transmission signal based on transmit data and the signature waveform, the transmit data being data configured to be transmitted to the second device.

In general, in another aspect, a system for time-reversal wireless communication includes a first device that has an input circuit and a data processor. The input circuit is configured to receive a handshake signal transmitted from a second device through multiple propagation paths, the handshake signal including a sequence of codes known to the first and second devices. The data processor is configured to perform cross correlation operations on the known sequence of codes and the received handshake signal to determine cross correlation values; determine synchronization index based on the cross correlation values; determine a channel response signal based on the synchronization index and the cross correlation values; generate a signature waveform that is a time-reversed signal of the channel response signal; and generate a transmission signal based on transmit data and the signature waveform, the transmit data being data intended to be transmitted to the second device.

In general, in another aspect, a system for time-reversal wireless communication includes a first device that has an input circuit and a data processor. The input circuit is configured to receive a signal transmitted from a second device through multiple propagation paths, the received signal including a received version of a sequence of codes and data, the sequence of codes being known to both the first and second devices. The data processor is configured to perform cross correlation operations on a known version of the sequence of codes and the received version of the sequence of codes to determine cross correlation values; determine a synchronization index based on the cross correlation values; and identify the data within the received signal based on the synchronization index.

In general, in another aspect, a system for time-reversal wireless communication includes a first device and a second device. The first device includes an input circuit configured to receive a probe signal from the second device, the probe signal including first information and second information, the first information enabling the first device to determine a first synchronization index to identify the second information within the probe signal, the second information enabling the first device to determine a multipath channel response. The first device further includes a data processor configured to generate a signature waveform based on a time-reversed signal of the multipath channel response; apply the signature waveform to third information and fourth information to generate a transmit signal, and transmit the transmit signal to the second device through multiple propagation paths. The second device includes an input circuit configured to receive the transmit signal; and a data processor configured to determine a second synchronization index based on the third information; and identify the fourth information within the received transmit signal based on the second synchronization index.

In general, in another aspect, a system for time-reversal wireless communication includes a base station that has an input module and a data processor. The input module is configured to receive a first probe signal from a first device, and to receive a second probe signal from a second device. The data processor is configured to generate a first signature waveform based on the first probe signal, the first probe signal comprising synchronization information to enable the base station to determine a synchronization index for the first probe signal; generate a second signature waveform based on the second probe signal, the second probe signal comprising synchronization information to enable the base station to determine a synchronization index for the second probe signal; apply the first signature waveform to a first code and first data to generate first transmit data, the first data being intended for the first device, the first code configured to enable the first device to determine a synchronization index for data transmitted from the base station and intended for the first device; apply the second signature waveform to a second code and second data to generate second transmit data, the second data being intended for the second device, the second code configured to enable the second device to determine a synchronization index for data transmitted from the base station and intended for the second device; and combine the first transmit data and the second transmit data to generate combined transmit data. The base station further includes an output module configured to transmit the combined transmit data to the first and second devices, the combined transmit data being sent to the first device through first multiple propagation paths, the combined transmit data being sent to the second device through second multiple propagation paths.

The details of one or more implementations of time-reversal wireless communication systems are set forth in the accompanying drawings and the description below. Other features, aspects, and advantages will become apparent from the description, the drawings, and the claims.

BRIEF DESCRIPTION OF THE DRAWINGS

FIG. 12 shows a Toeplitz matrix.

Like reference symbols in the various drawings indicate like elements.

DETAILED DESCRIPTION

Figure 1:
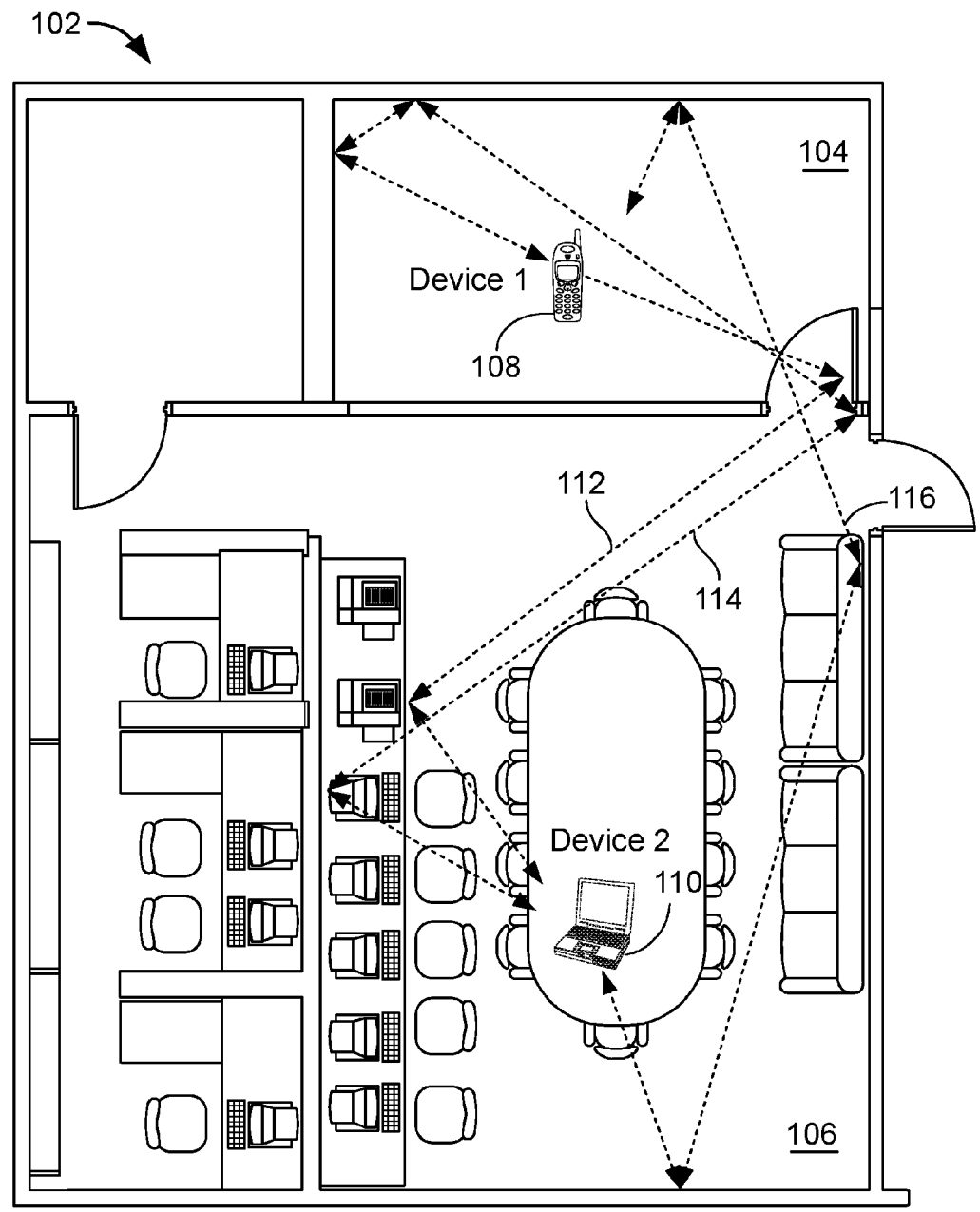
FIG. 1 is a diagram showing an exemplary environment for operating a time-reversal system.

This disclosure describes a novel handshaking method for a time-reversal wireless communication system that provides accurate timing synchronization between a transmitter and a receiver.

In this description, depending on context, the term "user" may refer to a device. For example, in a system that has multiple devices communicating with a base station, the term "multi-user uplink" refers to the uplink by multiple devices, and the term "inter-user interference" refers to the interference among various devices.

The time-reversal division multiple access technology has a wide variety of applications. For example, an intelligent house may include one or more computers that communicate wirelessly with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system).

A home lighting system may include a controller that controls intelligent light bulbs (e.g., bulbs that use light emitting diodes (LED) or laser technology) to adjust color and/or brightness of the bulbs. The controller may communicate with the intelligent bulbs using time-reversal wireless communication. The communication module at the light bulb using time-reversal technology can be made at a lower cost compared to, e.g., a communication module using Wi-Fi or Bluetooth technology. Thermostat controllers, smoke detectors, security systems, and phone systems may communicate with one another using time-reversal communication technology. For example, a smoke/carbon monoxide detector that detects smoke or carbon monoxide may communicate with the thermostat to shut off the boiler, communicate with a home security system that notifies the fire department, or communicate with a phone system that sends an alert text or voice message or e-mail to the home owner. The smoke detector may have motion sensors that can detect the presence of people, and may announce voice messages in case of emergency. For example, if a home has smoke detectors installed at several locations, a first smoke detector that detects smoke in the first floor kitchen may communicate with a second smoke detector located on the third floor bedroom where a home owner is sleeping to cause the second smoke detector to broadcast an announcement alerting the home owner that smoke is detected in the first floor kitchen.

A home or office may have multiple devices that have clocks. The devices may communicate with a controller that provides an accurate time signal so that all the devices in the home or office can be synchronized. The controller can provide the time signals to the various devices using time-reversal wireless communication.

Plant care (e.g., in a greenhouse, home, or office building) may be partially automated by use of sensors that sense soil conditions and provide information to indicate whether watering or fertilization is needed, the amount of water and fertilizer required, and the type of fertilizer needed. For example, a plant care module may be inserted into the soil or planting medium adjacent to each plant, in which the plant care module may have a storage that stores information about the plant, such as the type of plant, the level of moisture that should be maintained, and how often and what type of fertilizers need to be applied, the date and time in which water or fertilizer was applied, and the type and amount of fertilizer applied. The plant care module may have sensors that sense the soil conditions and a communication module to communicate with an automated plant care system, such as a robot that can provide water and fertilizers based on the information sent from the plant care module. The plant care module can communicate with a lighting system that controls the amount of light provided to the plant and a temperature control system that controls the temperature in the vicinity of the plant. For example, the communication module can use time-reversal wireless communication technology that requires little power, and the plant care modules can be powered by solar cells to eliminate the need to change batteries.

Vehicles may have time-reversal wireless communication modules that communicate with various sensors, beacons, or data processing modules in garages, driveways, or buildings. For example, garages may be retrofitted with sensors and beacons to assist vehicles (e.g., autonomous vehicles) to find and park into parking spaces. Robots may have time-reversal wireless communication modules that communicate with various sensors, beacons, or data processing modules in homes or office buildings to assist in navigation or to provide information about the environmental conditions or other information (e.g., tasks that need to be performed at particular locations). As discussed below, time-reversal wireless communication has an asymmetrical nature in which the base station performs most of the signal processing as both a transmitter (for the downlink) and receiver (for the uplink), allowing the use of low complexity terminal devices. Thus, a large number of terminal devices (e.g., sensors) can be deployed at a low cost. Because the terminal devices require little power, they can be powered by solar cells or piezoelectric components to eliminate the need to recharge batteries, or be power by batteries that last for a long lifetime.

In an assembly plant, critical components may have embedded processors that store and process data and communicate with one or more external controllers using time-reversal wireless communication technology to ensure that the critical components function properly, and have been properly processed in previous stages before moving to the next stage. For example, an engine of a vehicle can have an embedded module having a data processor and storage that stores information about all the tests that have been performed in previous stages before being assembled with the car chassis. An airplane may be assembled from components manufactured by companies in different countries. Each component can have an embedded module that has a data processor and storage that stores information about the component, such as characteristics of the components and results of tests that have been performed on the component. The embedded modules may communicate with one or more external controllers using time-reversal wireless communication technology. Use of such embedded modules can increase the quality of the final products by ensuring that each component has been properly processed and tested.

In some examples, a controller may communicate with multiple sensors or devices using time-reversal wireless communication, and communicate with other devices using other communication protocols. For example, a controller may communicate with intelligent light bulbs, temperature sensors, and power meters using time-reversal wireless communication, and communicate with a smart phone using Wi-Fi communication. The controller serves as a bridge between devices that use low cost time-reversal communication modules and devices (e.g., smart phones or network routers) that follow Wi-Fi or Bluetooth communication protocols.

For example, an intelligent factory may include one or more computers that communicate wirelessly with robots working in assembly lines, vehicles that move supplies and assembled products, climate control systems, security systems, inventory control systems, and power systems. For example, a laboratory may include one or more computers that communicate wirelessly with instruments that monitor parameters when conducting experiments.

In the examples above, the computer (or controller) can communicate with the devices using time-reversal division multiple access technology that uses the environment to provide spatial filtering, allowing a large number of devices to communicate with the computers simultaneously. Compared to using previous wireless communication technologies, such as Wi-Fi or Bluetooth, time-reversal division multiple access has the advantage that the additional cost for enabling each device to communicate with the computer (or controller) is small because the device itself does not need to perform complicated signal processing. Most of the signal processing is performed at the computer (or controller). The power consumption by each device for enabling wireless communication is also much smaller compared to previous wireless technologies.

For example, a swarm of robots and/or unmanned aerial vehicles (drones) can communicate wirelessly with each other using time-reversal division multiple access technology. For example, some of the robots and/or drones can function as controllers that perform more complicated signal processing, while the other robots and/or drones function as terminal devices that do not need to perform the complicated signal processing, For rescue robots working in disaster situations, such as in partially collapsed buildings or underground tunnels, multi-path interference may be especially severe for conventional wireless technologies based on, e.g., Wi-Fi or Bluetooth. The multiple signal paths can be used advantageously by time-reversal division multiple access technology, in which the environment provides spatial filtering. For small aerial drones that have small batteries or use solar power, reducing the energy required for wireless communication will allow the energy to be used elsewhere, such as increasing the flight time of the drones.

For example, wearable devices can communicate wirelessly with each other and/or with a controller using time-reversal division multiple access technology. For example, wearable energy generating devices (such as piezoelectric power generators) can be integrated into clothing and/or shoes, and used to provide power to sensors that monitor body parameters. For example, the sensors can be used to measure respiratory patterns, heart beat patterns, walking/running patterns, and/or sleeping patterns. The sensors can wirelessly send measured data to a controller (e.g., smart phone or computer) that processes the collected data. The processed data can be presented in a user-friendly graphical interface.

Because time-reversal division multiple access technology requires very little power, the wearable sensors can be powered by the energy generated by the movements of the body (e.g., using piezoelectric components). In some examples, the wearable energy generating devices charge a rechargeable battery, which in turn powers the sensors. In that case, use of time-reversal division multiple access technology removes the requirement to recharge the battery through external power sources, or increases the time duration between recharging. Because time-reversal division multiple access technology requires less power than other communication technologies such as Wi-Fi or Bluetooth, there may be less side effects on the human body due to exposure to electromagnetic signals.

The time-reversal division multiple access scheme uses the multi-path channel profile associated with each user's location as a location-specific signature for the user. Each path of the multi-path channel is treated as a virtual antenna in the time-reversal division multiple access system, which collectively results in very high-resolution spatial focusing with "pin-point" accuracy. The computer (or controller) may function as a base station or be coupled to a base station that performs most of the signal processing when transmitting signals to the devices and receiving signals sent from the devices.

Because the signals are transmitted through multiple propagation paths having various propagation lengths, a transmitter and a receiver need to obtain information about the overall system, e.g., information about the communication channel and information about time synchronization. In some implementations, such information is obtained in a channel probing (CP) phase and a data transmission (DT) phase of a time-reversal communication system. In the channel probing phase, the transmitter acquires channel information to realize the focusing effects, while in the data transmission phase, the receiver acquires timing information to synchronize and sample relevant signals. The process of obtaining channel information in the channel probing phase and obtaining synchronization in the data transmission phase is referred to as time-reversal handshaking. The following describes several handshaking methods for obtaining necessary channel and timing information for enabling time-reversal communication systems.

Overview of Time-Reversal System

The following provides an overview of a time-reversal system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multi-path signal. As the signal travel through the propagation paths, the signal may become distorted and noise may be added. The multipath signal received by the second device 110 can be quite different from the signal transmitted by the first device 108.

Figure 2A:
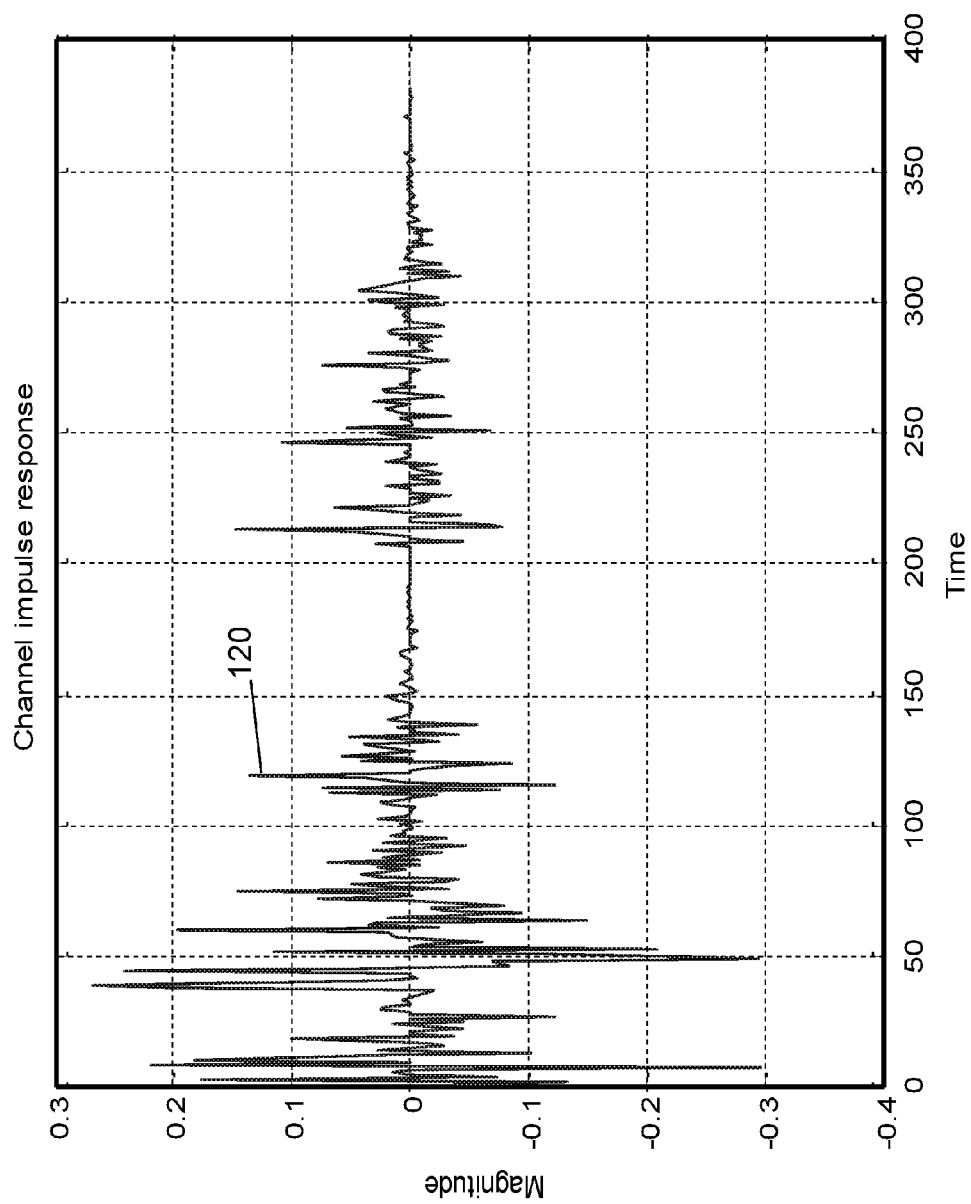
FIG. 2A is a graph of an exemplary recorded channel impulse response waveform.

For example, referring to FIG. 2A, when the first device 108 sends a pulse signal, the signal received by the second device 110 may have a waveform 120. The waveform 120 is referred to as the channel impulse response signal.

Figure 2B:
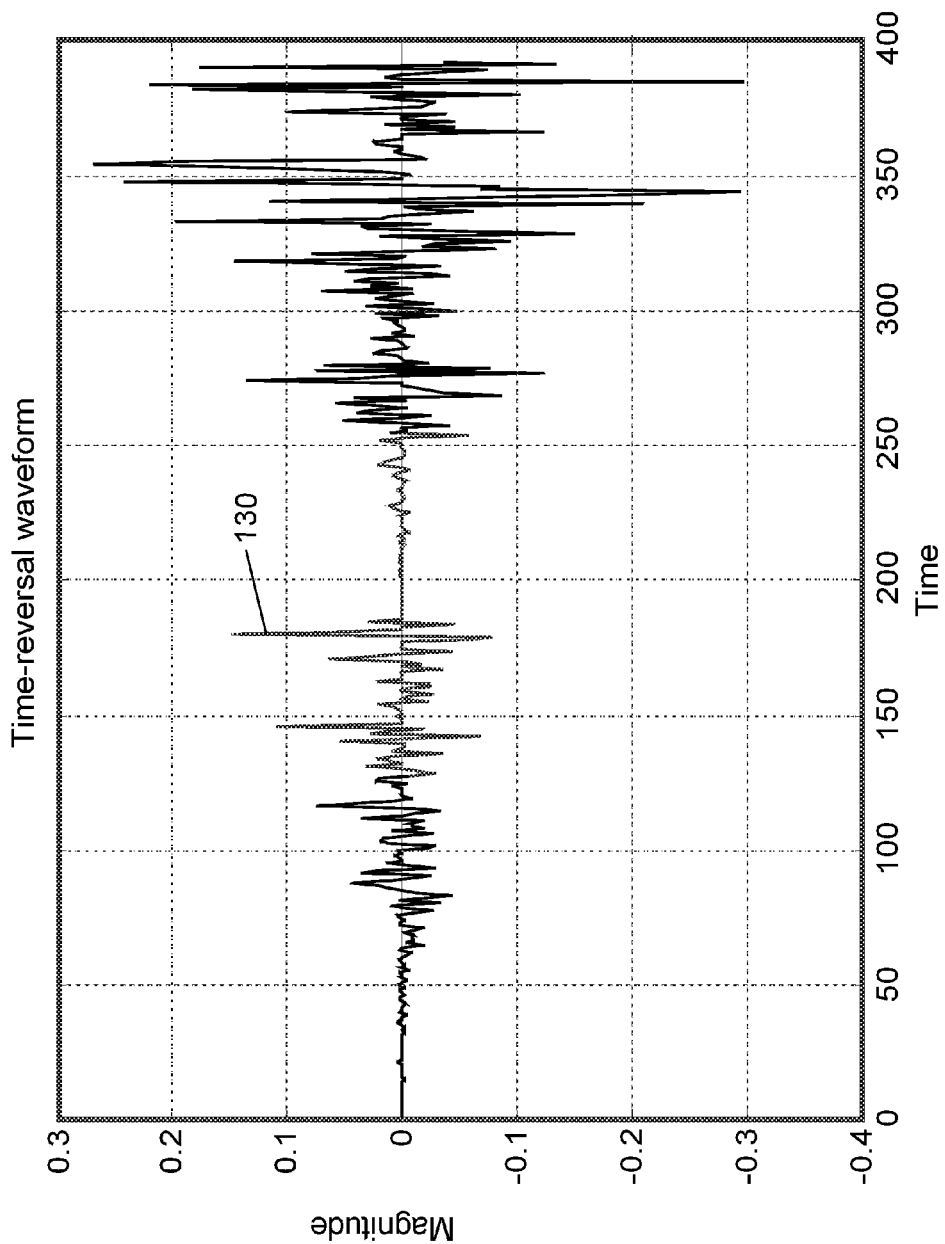
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 forms an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted.

When the second device 110 intends to transmit a data stream to the first device 108, the second device 110 uses normalized time-reversed conjugate signals as a basic waveform. The second device 110 loads the data stream on the basic waveform, and transmits the signal through the wireless channel. Usually the sampling rate is higher than the baud rate. The signal received at the receiver is the convolution of the transmitted signal and the channel impulse response, plus additive white Gaussian noise. The first device 108 performs a simple adjustment to the received signal and down-samples it to recover the data stream transmitted by the second device 110.

In some examples a transmitter may send signals to two or more receivers at the same time. The transmitted signal travel through multiple propagation paths to each receiver. Because the receivers are positioned at different locations, the multipath signals travel through different propagation paths to reach the receivers, different multipath signals will be received at different receivers. By carefully constructing the waveform of the signal sent from the transmitter, it is possible to allow each receiver to receive data intended for the receiver with sufficiently high quality.

Figure 3:
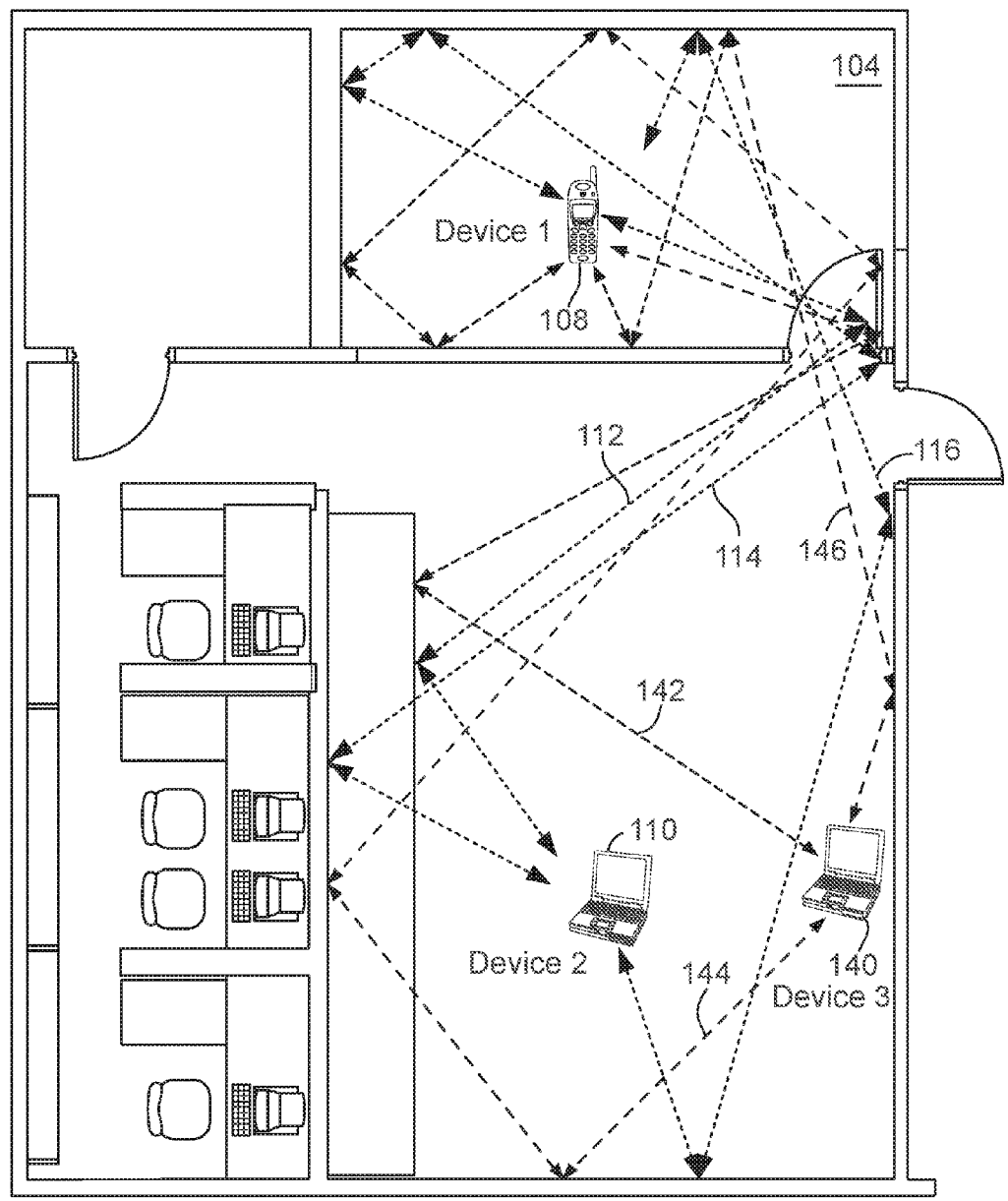
FIG. 3 is a diagram showing an exemplary environment for operating a time-reversal system having multiple receivers.

Referring to FIG. 3, the first device 108 may communicate with the second device 110 and a third device 140. The second device 110 sends a probe signal that travels through propagation paths 112, 114, and 116 to the first device 108. The probe signal can be, e.g., a pulse signal, a signal that has a predetermined waveform, or a signal that includes symbols. The first device 108 records the received waveform, and determines channel and timing information for the first multipath channel. The third device 110 sends a probe signal that travels through propagation paths 142, 144, and 146 to the first device 108. The first device 108 records the received waveform, and determines channel and timing information for the second multipath channel.

The first device 108 constructs a downlink signal that includes a first portion that is intended to be received by the second device 110 after the downlink signal propagates through the first multipath channel (including propagation paths 112, 114, and 116). The first portion is determined based on a first time-reversed multipath channel response, and is designed such that, after propagating through the first multipath channel, the signal received by the second device 110 includes first timing information and a first payload. The first timing information enables the second device 110 to accurately determine the beginning of the first payload, which includes data intended for the second device 110.

The downlink signal includes a second portion that is intended to be received by the third device 140 after the downlink signal propagates through the second multipath channel (including propagation paths 142, 144, and 146). The second portion is determined based on a second time-reversed multipath channel response, and is designed such that, after propagating through the second multipath channel, the signal received by the third device 140 includes second timing information and a second payload. The second timing information enables the third device 140 to accurately determine the beginning of the second payload, which includes data intended for the third device 140.

In the example of FIG. 3, the first device 108 may use either an omnidirectional antenna or a directional antenna for broadcasting the downlink signal, as long as the downlink signal reaches each of the second and third devices 110 and 140 through multiple propagation paths.

In some examples, a multiple input multiple output (MIMO) system may be used in which the device operating as a transmitter has multiple transmit antennas, and each of the devices operating as a receiver has multiple receive antennas.

System Architecture

A time-reversal division multiple access architecture has two parts, the downlink part and the uplink part. In a time-reversal division multiple access downlink system, a base station (BS) transmits multiple data streams to several users simultaneously, in which each user is associated with a unique multi-path profile in rich-scattering environments. The time-reversal division multiple access downlink scheme exploits the spatial degrees of freedom of the environment and focuses the useful signal power mostly at the intended locations. Time reversal mirrors (TRMs) at the base station first time-reverse the channel response of each user's channel as the user's signature waveform, and then embed these signatures into the corresponding data streams. The transmitted signal from the base station in the time-reversal division multiple access downlink is a mixed signal that includes the data intended to be sent to several users (including different data intended for different users). When the combined signal propagates to a certain user through the corresponding multipath channel, a large number of multi-paths having identical phases will automatically resonate at this user's location, resulting in the spatial focusing of the power of the useful signal component that carries this user's data.

Within the time-reversal division multiple access framework, more sophisticated signature waveforms than the basic time-reversal waveform can be derived based on the multi-path channel responses to further improve the performance of the time-reversal division multiple access downlink system, when additional computational complexity is affordable at the base station. One desirable feature of the time-reversal division multiple access downlink scheme is that most of the complexity in communication can be shifted to the base station side, facilitating low complexity in communication components at the end-users.

A time-reversal division multiple access uplink scheme can be implemented in which the terminal devices have low complexity communication components. The time-reversal division multiple access uplink scheme shares a strong duality in the mathematical structure with the downlink without increasing the complexity of the end-users. A virtual spatial focusing effect can be observed in the user's signature domain at the base station. Similar to that of the downlink scheme, the virtual spatial focusing effect enables the base station to use the user's time-reversal signature waveform to extract the useful component from the combined received signals, allowing multiple users accessing the base station simultaneously. Additionally, unlike many other conventional communications paradigms that adopt symmetric architectures, the uplink scheme shares the same processing power and channel knowledge at the base station with the downlink, allowing the end-user's communication component to have a low complexity.

Figure 4:
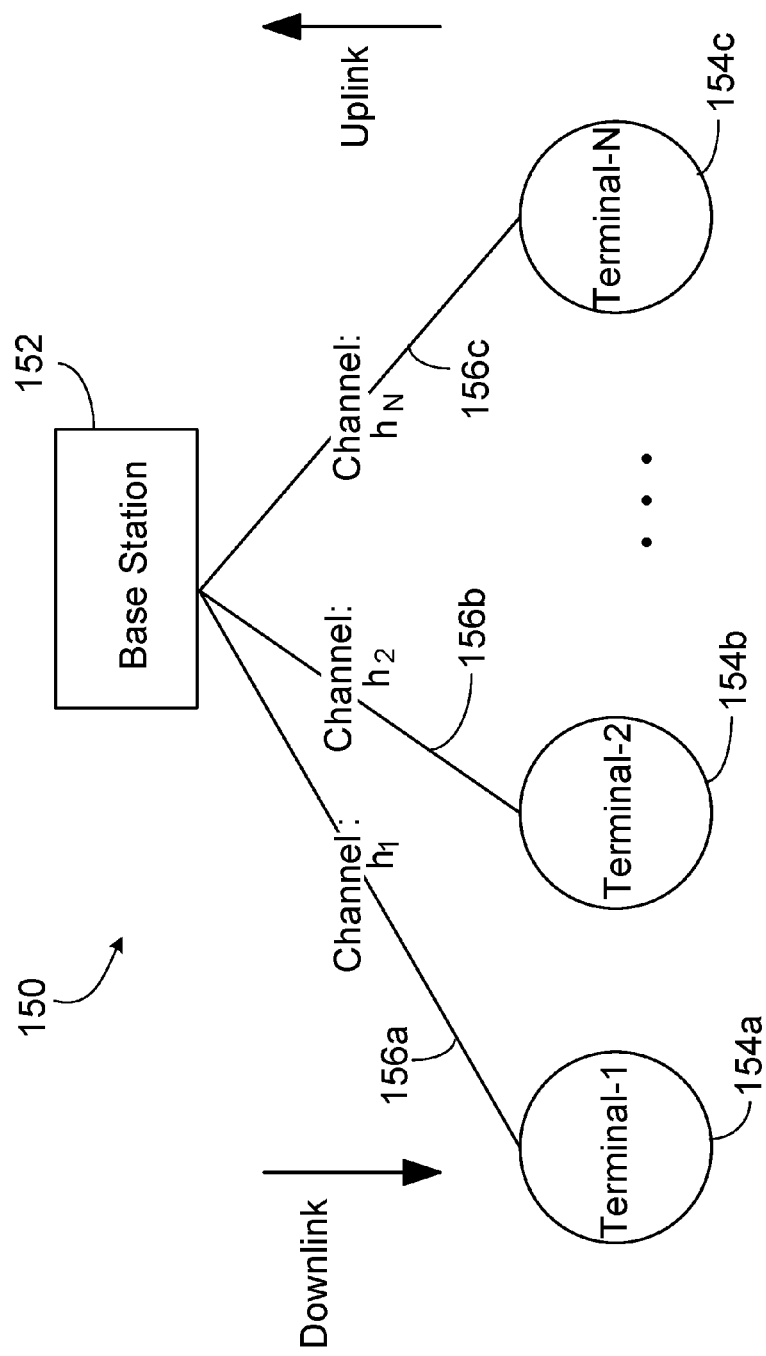
FIG. 4 is a diagram of an exemplary multi-user time reversal communication system.

Referring to FIG. 4, an exemplary multi-user time reversal communication system 150 includes a base station (BS) 152 and multiple terminal devices (e.g., 154a, 154b, 154c, collectively 154). Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band, and the system operates in multi-path environments. For the downlink, the base station 152 can send multiple messages (either independent or non-independent) simultaneously to multiple selected terminals 154. For the uplink, multiple terminals 154 can send their own messages to the base station 152 simultaneously.

After each terminal device 154 registers with the base station 152, hand-shaking occurs periodically between the base station 152 and each of the registered terminal devices 154 so that the base station 152 can maintain up-to-date records of the channel responses associated with the terminal devices 154. The hand-shaking also enables the base station 152 and the terminal devices 154 to obtain accurate timing information.

Figure 5:
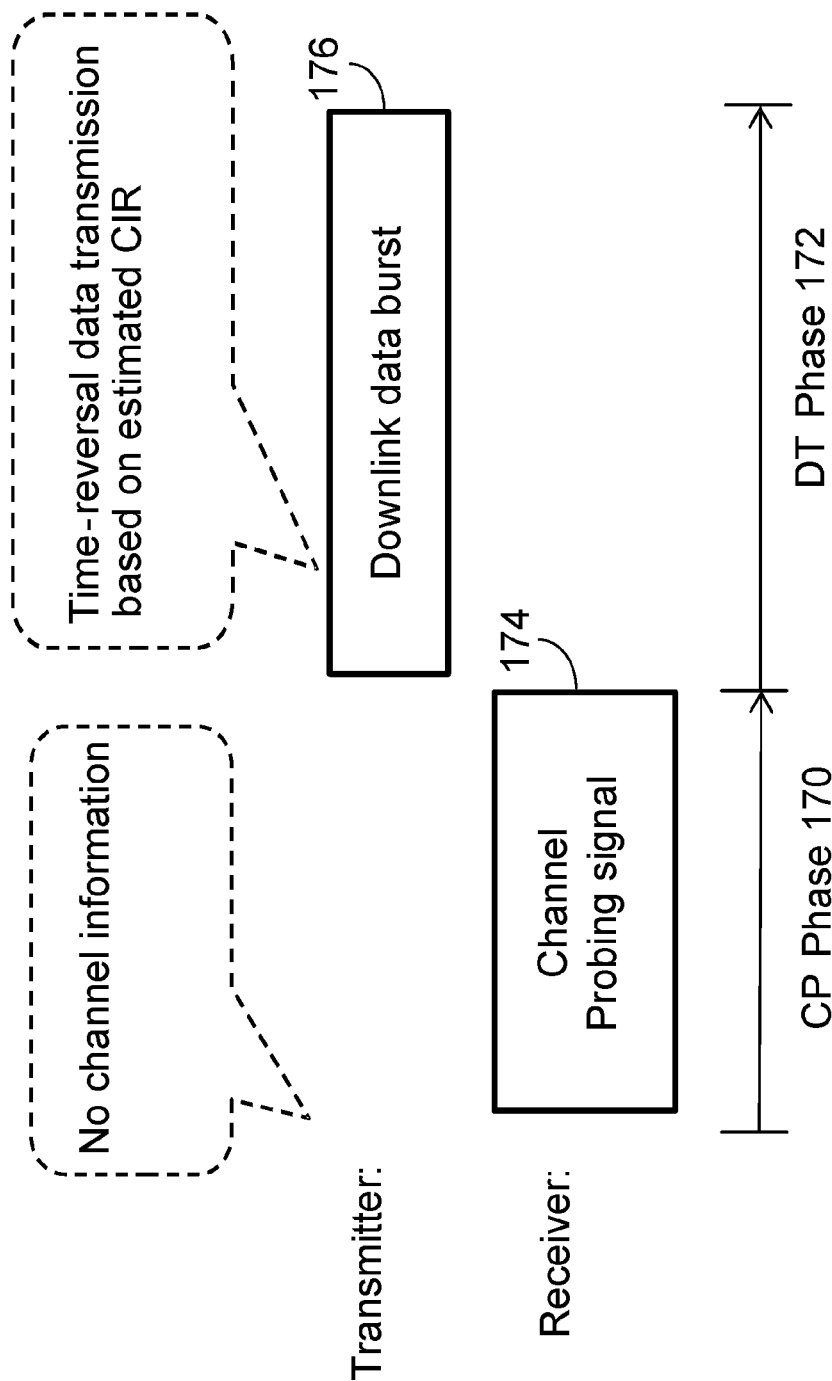
FIG. 5 is a diagram of various phases of time-reversal wireless communication.

Referring to FIG. 5, in general, in a time reversal communication system, communication between a first device and a second device occurs in two phases: the channel probing phase 170 and the data transmission phase 172. In the description below, when two devices are performing time reversal wireless communication, the device that sends payload data is referred to as the "transmitter" and the device that receives payload data is referred to as the "receiver," even though during the channel probing phase the "receiver" may send a channel probing signal to the "transmitter."

In the channel probing phase 170, the receiver first sends a channel probing signal 174 that propagates through a scattering and multi-path environment, and the signals are received by the transmitter. The transmitter estimates the channel response (CR). In the data transmission phase 172, the transmitter transmits the time-reversed channel response with useful information back through the same channel to the receiver. Due to channel reciprocity, the wave is focused at the receiver at a particular time instant. The receiver simply samples at the focusing time instant to obtain the useful information.

During the channel probing phase, the transmitter needs to obtain channel information that is sufficiently accurate in order to realize the focusing effects. In the data transmission phase, the receiver needs to obtain sufficiently accurate timing information in order to synchronize and sample the signal at the correct time. The process of obtaining channel information in the channel probing phase and getting synchronized in the data transmission phase is referred to as time reversal handshaking.

The time reversal communication system 150 has many advantages. The system 150 leverages the multi-path channel as a matched filter, i.e., harvesting energy from the scattering environment, it is highly energy efficient. Moreover, because the receiver only needs to sample at the particular time instant without sophisticated processing to obtain the useful information, the receiver is easy to implement, i.e., the computational complexity at the receiver can be low. The advantages mentioned above depend on having adequate knowledge about the overall system at both the transmitter and the receiver, e.g., the channel information and time information. Such information needs to be obtained in the channel probing phase and the data transmission phase of the time reversal communication system.

Figure 6:
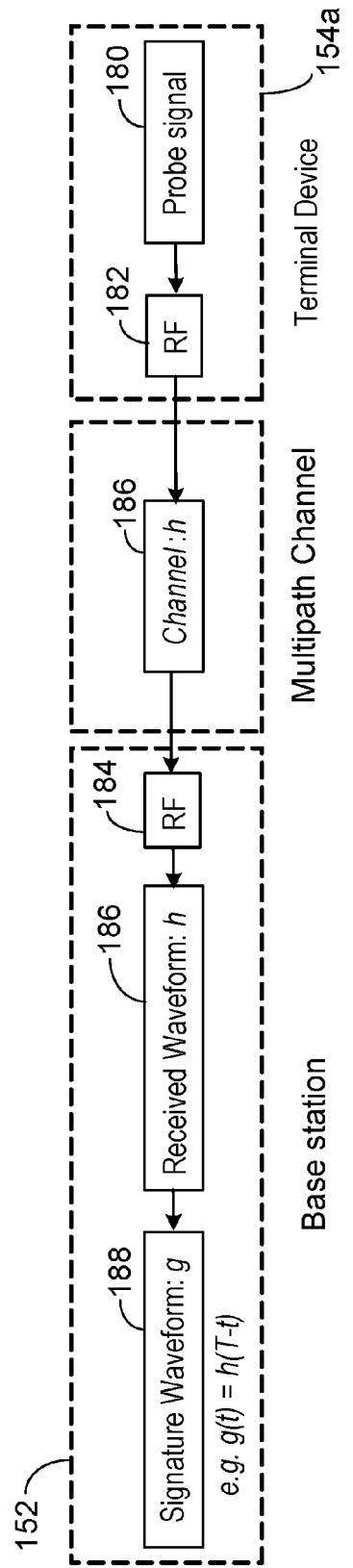
FIG. 6 is a diagram of a time-reversal wireless communication system during channel probing phase.

Referring to FIG. 6, in some implementations, during the channel probing phase, a terminal device, e.g., 154a, generates a channel probing signal 180 and performs radio frequency modulation 182 to produce a radio frequency signal that propagates through the associated multi-path channel 186 to the base station 152. The base station 152 receives the transmitted radio frequency signal, performs radio frequency demodulation 184 to recover the unique channel response (waveform) 186 and records it. Upon receiving the channel response 186 associated with the terminal 154a, the base station 152 calculates a signature waveform 188 for the terminal 154a based on its channel response received at the base station 152. The term "channel probing signal" depending on context may refer to the probe signal before radio frequency modulation or the signal after applying the radio frequency modulation.

The purpose of the channel probing phase is to help the transmitter (which, in the example of FIGS. 4 and 6, is the base station 152) estimate the unknown channel response. To achieve this purpose, the transmitter needs to first synchronize with the channel probing signal by countering the multipath effect without the knowledge of channel information. The general channel probing signal includes two parts: preamble and possible confirmation bits. At the transmitter side, the transmitter synchronizes with the channel probing signal by extracting the underlying features of the preamble that are not corrupted by the multipath fading. The confirmation bits are then used to further validate the synchronization. Once the synchronization is achieved, the next step for the transmitter is to extract the channel response from the received signal by using the information in the channel probing signal.

The handshaking in the data transmission phase is to assist the receiver to sample at the right time instant, i.e., to achieve symbol synchronization as perfectly as possible. Different from the channel probing phase where the channel information is unknown, in the data transmission phase, we have the channel information that is pre-estimated in the channel probing phase. In such a case, we can take advantage of the unique focusing effect of the time reversal system by using the estimated channel response. The handshaking in the data transmission phase achieves synchronization by using the estimated channel response obtained in the channel probing phase.

The following describes two examples of handshaking methods for the channel probing phase. The first method uses pulse position modulation, whereas the second method calculates the correlation of a pseudorandom sequence. One example of correlation-based handshaking method for the data transmission phase will be described.

Least Square (LS) Based Channel Probing Handshaking

The following describes a least square (LS) based handshaking method for the channel probing phase. In this method, the receiver sends the handshaking signal to the transmitter. The transmitter synchronizes with the received signal and estimates the channel response based on the received signal.

Figure 7:
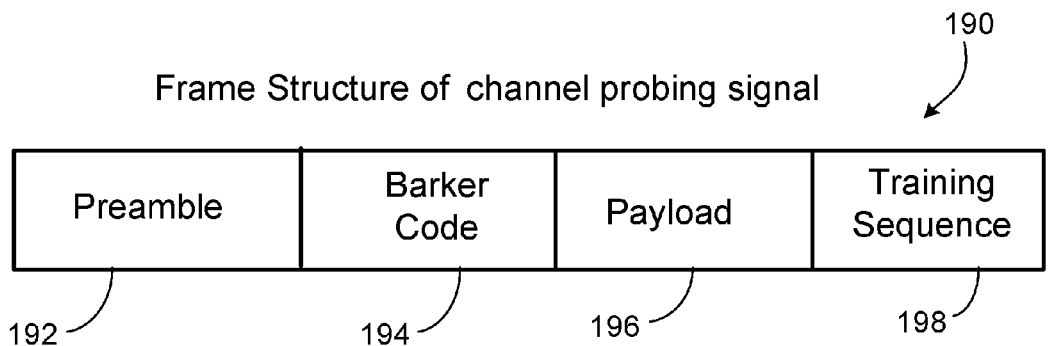
FIG. 7 is a diagram of a frame structure of a channel probing signal.

Referring to FIG. 7, in some implementations, a frame of a channel probing signal 190 transmitted by the receiver includes four consecutive parts: a preamble 192, a barker code 194, a payload 196, and a training sequence 198. The length of each frame is fixed in this method and known by both the transmitter and the receiver. In some examples, the receiver may send two or more frames of channel probing signals to the transmitter during the channel probing phase to allow the transmitter to obtain more accurate channel and timing information. In some implementations, the accuracy of timing can be improved by increasing the length of the preamble 192 and Barker code 194, and the accuracy of channel information can be improved by increasing the length of the training sequence 198.

Figure 8:
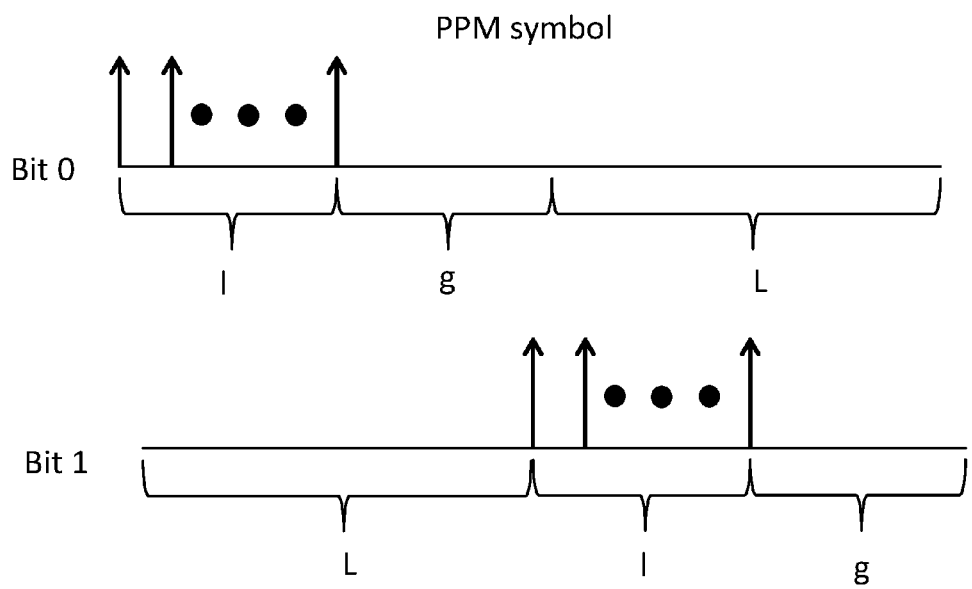
FIG. 8 is a diagram of pulse position modulation symbols.

The preamble 192 is modulated using pulse position modulation (PPM). The pulse position modulation symbols '0' and '1' are shown in FIG. 8. The preamble 192 includes consecutive pulse position modulation symbol '0's in which L is the length of the multipath channel that is defined by $$L = \frac{\tau_s}{\delta_t}$$

where $\tau_s$ is the delay spread and $\delta_t$ is the sampling period of the system. In practice, even though the channel length is not exactly known, the transmitter can estimate the channel length based on the typical delay spread of the environment and the sampling rate of the system. In this method, the performance will not be affected if the estimated channel length is longer than the actual channel length. Therefore, the transmitter can overestimate the channel length and set L to be greater than the actual channel length without generating an error.

The barker code 194 transmitted by the receiver is a code known by both the transmitter and the receiver. The length of the barker code 194 is $L_b$.

The payload 196 transmitted by the receiver can be encoded information that is modulated using pulse position modulation. The information may contain the index of the training sequence 198. The length of the payload 196 is $L_p$.

Figure 9:
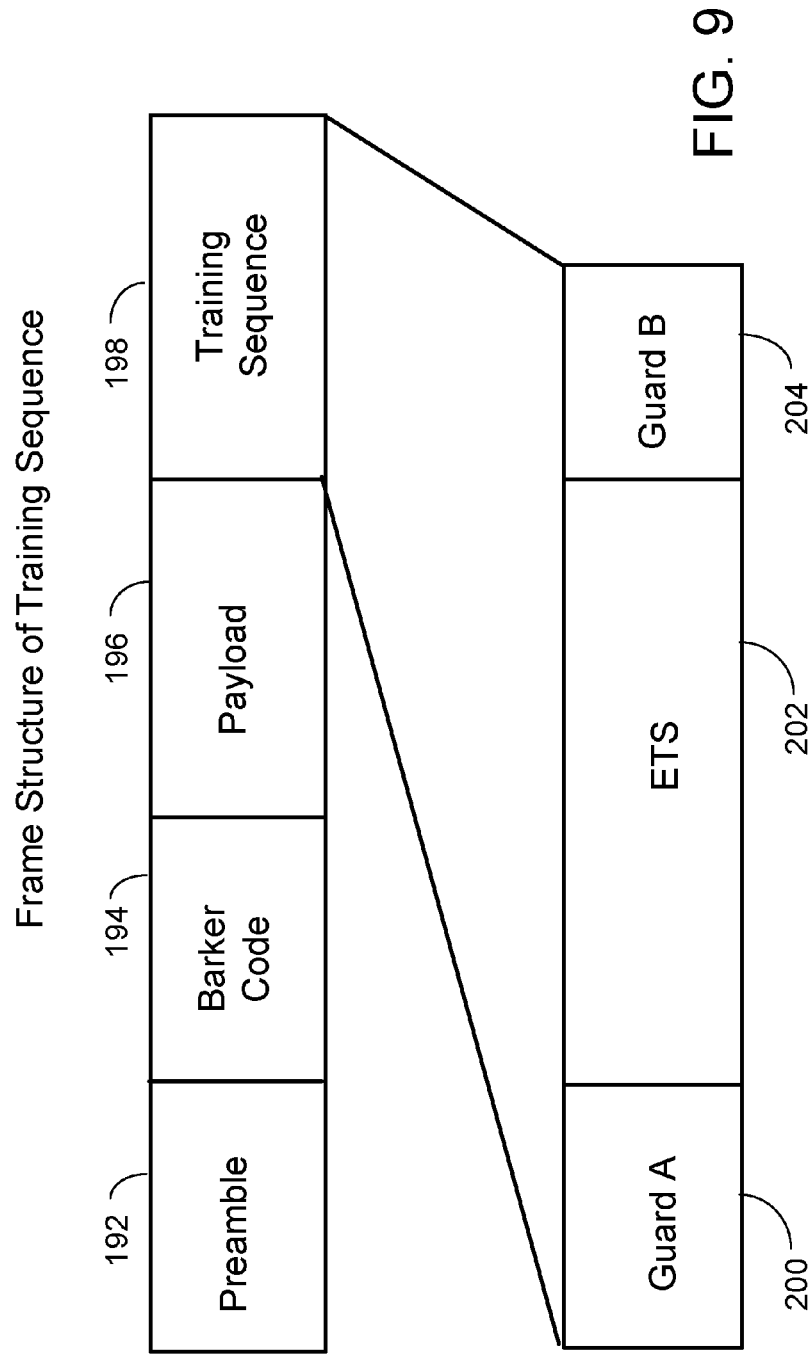
FIG. 9 is a diagram of a frame structure of a training sequence.

Referring to FIG. 9, the training sequence 198 has three consecutive parts, including a guard interval A 200, an effective training sequence (ETS) 202, and a guard interval B 204. In some examples, the guard interval A 200 is a sequence of '0' bits having a length $L_a$, the effective training sequence 202 is a sequence of '0' and '1' bits having a length $L_e$, and the guard interval B 204 is a sequence of '0' bits having a length $L_B$ in which $L_B \geq L$.

The channel probing signal transmitted from the receiver passes through the multipath channel and reaches the transmitter. The received signal is a convolution of the channel probing signal and the channel response, contaminated by noise. The transmitter will use the received signal to estimate the channel response.

Figure 10:
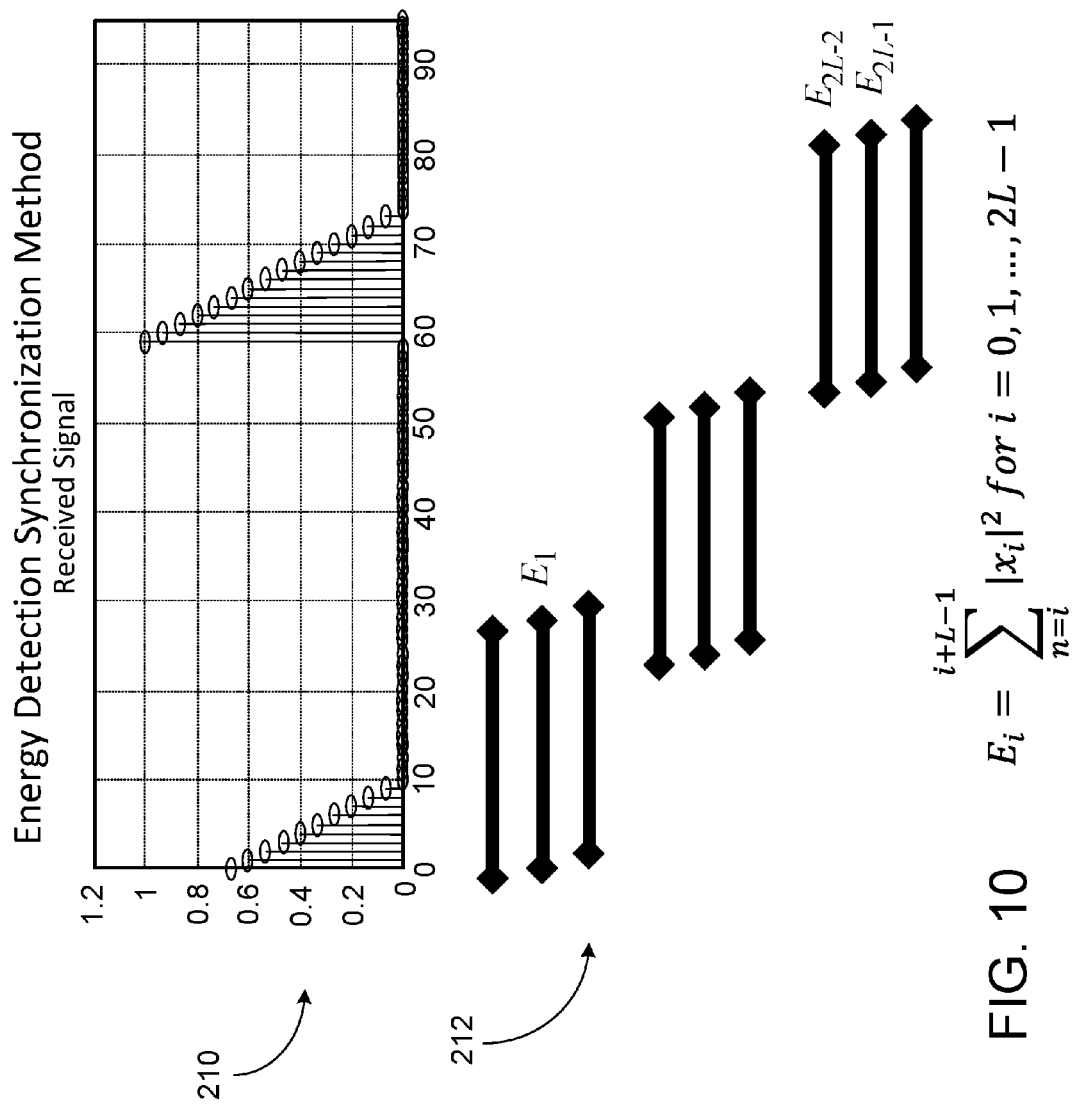
FIG. 10 is a diagram showing an energy detection synchronization process.

Referring to FIG. 10, upon receiving the channel probing signal, the transmitter determines a synchronization index using sliding window energy detection on the preamble 192 of the channel probing signal. A graph 210 shows an example signal received at the transmitter. The sliding window energy detection method using a moving window 212 having a window size $L_w = l_p + L$, in which $l_p$ is the length of a PPM symbol. We define $E_I$ as the average energy accumulated by the window starting from the i–th, (i+$L_w$)–th, (i+2$L_w$)–th, ..., and (i+($\gamma$−1)$L_w$)–th sample, in which y is the number of averaging windows, i ∈ {0, 1, 2, ..., $L_w$−1}. The synchronization index $i_s$ is the index i that maximizes the $E_i$, which can be written as follows: $i_s$=argmax$_i$ $E_i$. Here, the index i corresponds to the i-th sample in the received signal. After the synchronization index $i_s$ is determined, the other indices are determined using the synchronization index $i_s$ as reference.

Figure 11:
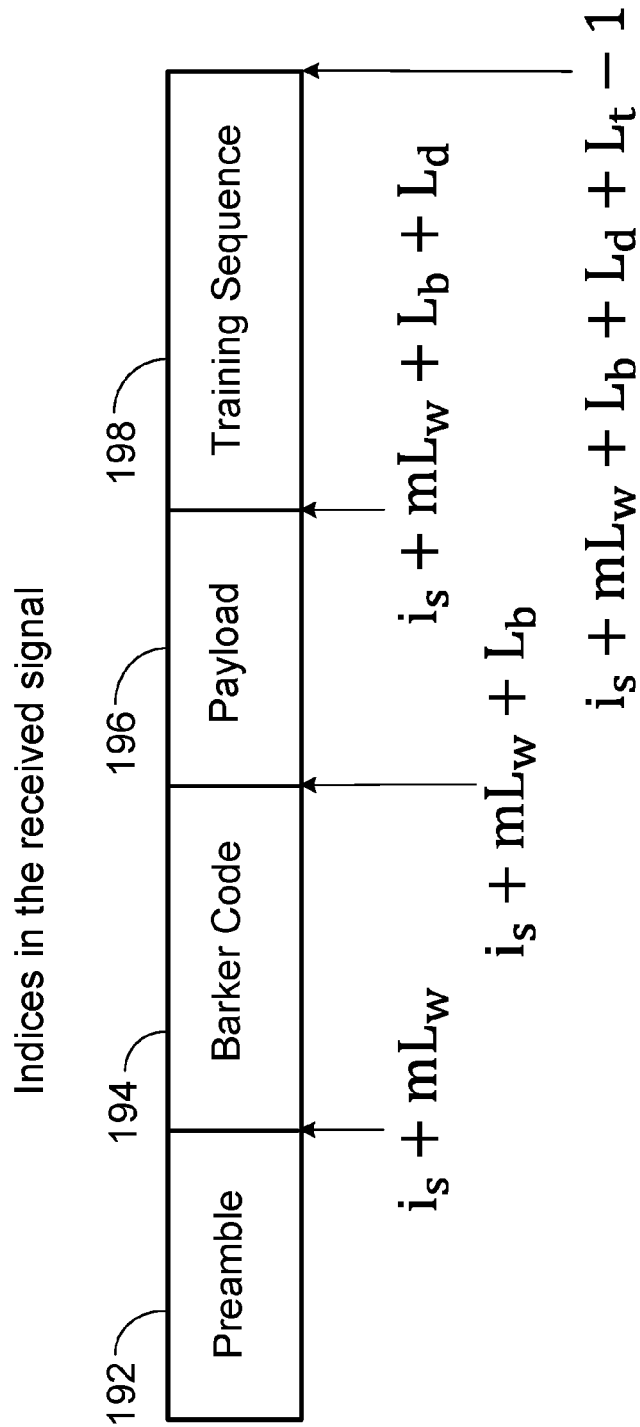
FIG. 11 is a diagram showing indices in a received signal.

Referring to FIG. 11, after obtaining the synchronization index $i_s$, the transmitter starts to detect the barker code 194 to confirm the synchronization. The transmitter demodulates a portion of the received signal from the index $i_s$+m$L_w$ to the index $i_s$+m$L_w$+$L_b$−1, and compares the demodulated signal portion with a pre-stored barker code sequence, in which $L_b$ is the length of the barker code 194, m ∈ {0, 1, . . . N} with N being a search range set by the user. In some examples, N is set to be greater than the number of pulse position modulation symbols in the preamble. Once the demodulated signal matches the pre-stored barker code, the transmitter is assured that the receiver is in the channel probing phase, and the payload and the training sequence will follow the barker code in the received signal. Moreover, the transmitter knows that the matching index $i_s+mL_w$ is the position in the received signal where the barker code 194 begins, and the index $i_s+mL_w+L_b-1$ is the position where the barker code 194 ends. This information enables the transmitter to obtain information for estimating the channel response.

Because the payload 196 follows the barker code 194, the transmitter assumes that the payload 196 begins at the index $i_s+mL_w+L_b$. Because the payload has a fixed length $L_d$, the transmitter demodulates the portion of the received channel probing signal from index $i_s+mL_w+L_b$ to index $i_s+mL_w+L_b+L_d-1$, and decodes the demodulated portion to obtain the index q of the training sequence. Here, the index q does not refer to the q-th sample in the received signal. Rather, there is a set of two or more training sequences that is known to both the receiver and the transmitter, and the receiver can choose from any training sequence in the set. The index q indicates which one in the set of training sequences is selected by the receiver.

The transmitter assumes that the training sequence starts at index $i_s+mL_w+L_b+L_d$ of the received signal, and will use the portion of the received signal from index $i_s+mL_w+L_b+L_d$ to index $i_s+mL_w+L_b+L_d+L_t-1$ to estimate the channel response, in which $L_t=L_e+L$. Let u denote the fraction of the received signal from index $i_s+mL_w+L_b+L_d$ to index $i_s+mL_w+L_b+L_d+L_t-1$. The transmitter converts u to the estimated channel response using a conversion matrix $C_q$ that corresponds to the index q obtained from the payload. This conversion can be written as:

$$\widehat{CR} = C_q u.$$

where $\widehat{CR}$ is the estimated channel response.

The conversion matrix $C_q$ can be constructed by the training sequence $s_q$ used by the receiver as follows:

$$C_q = (T'T)^{-1}T'$$

where T is the Toeplitz matrix generated by $s_q$, which is the effective training sequence used by the receiver. The first column of the matrix T is $s_{qe}=[s_q; 0]$, in which 0 is the vector composed of L zeros. Referring to FIG. 12, the first row of the Toeplitz matrix T 220 is composed of all zeros except for the first element taken from $s_{qe}$. The matrix T 220 has dimensions $c_m \times c_q$ in which $c_m=L_e+L$ and $c_q=L_d+\tau+L$. The parameter τ is a compensation factor that needs to be greater than the maximum of synchronization mismatch in the previous step, i.e., the difference between the index in the received signal where the training sequence starts and index $i_s+mL_w+L_b L_d$, which is the beginning of the training sequence 198 detected by the transmitter.

Figure 13:
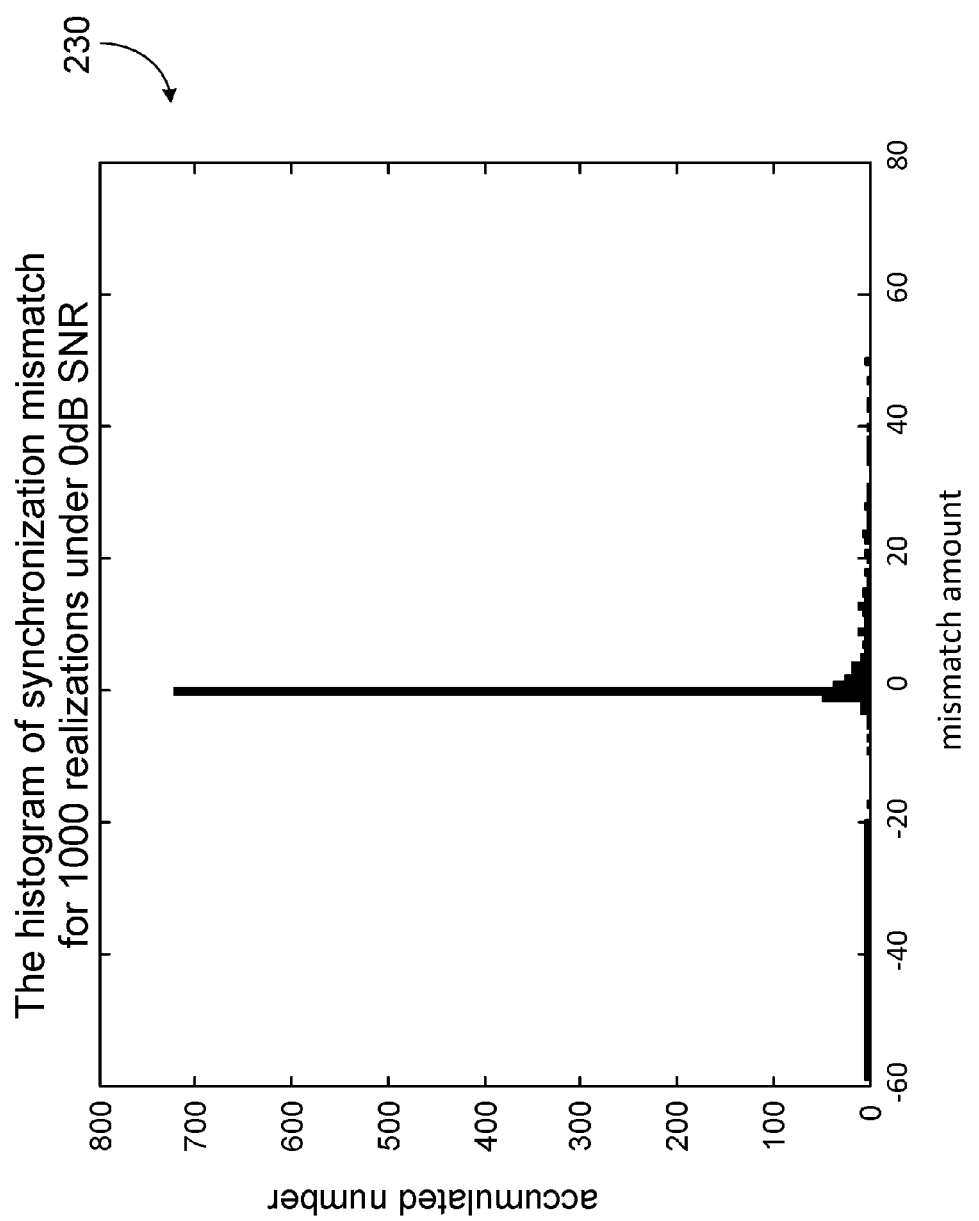
FIG. 13 is a histogram of synchronization mismatch.

FIG. 13 shows an example synchronization mismatch histogram for 1000 realizations with SNR=0 dB and channel length L=200. The mismatch amount is small compared with the channel length and can be bounded by some specific value. Since larger T takes up more system resource, the value of T can be chosen as small as possible that can still bound the synchronization error.

It can be seen from $\widehat{CR}=C_q u$ and the dimension of the conversion matrix $C_q$ that the estimated channel response has a size larger than L, which is the size of the actual channel response. The reason why a longer channel response is estimated is that, due to the synchronization error, the estimated channel response is a shifted version of the real channel response. Estimating a longer channel response ensures that the effective channel response will be included in the estimation such that no significant tap is lost, which is important to the time reversal system that uses the multi-path channel as a matched filter to focus transmitted waveforms at the receiving device.

When the effective training sequence is specifically chosen, the channel response can be estimated more easily without using the conversion matrix $C_q$. For example, if the effective training sequence is a train of impulses separated by D in which D≥L, then the channel response can be simply estimated by averaging the windows of size D in the received signal. Let $v_i$ denote the fraction of the received signal from index $i_s+mL_w+L_b+L_d+iD$ to index $i_s+mL_w+L_b+L_d+iD+D-1$, then the estimated channel response can be written as $$\widehat{CR} = \sum_0^K \frac{v_i}{K+1}$$

where $K=(L_e+L)/D$ is the number of windows. In some examples, if $L_e+L$ is large enough, K is large enough to provide sufficient accuracy for the estimated channel response $\widehat{CR}$.

Correlation Based Channel Probing Handshaking

The following describes a correlation based handshaking method for the channel probing phase. In this method, a single sequence is used for the purpose of both time synchronization and channel response estimation.

The receiver transmits a pseudo random (PN) sequence x to the transmitter through the multipath channel. The sequence x can be, e.g., a train of discrete random variables having probability mass function (pmf) shown in the equation below:

$$X(i) = \begin{cases} 1 & \text{with probality } 0.5 \\ -1 & \text{with probality } 0.5 \end{cases},$$

$$i = 1, 2, \ldots N$$

The autocorrelation function of the pseudo random sequence x is defined in the following equation:

$$r_x(m) = \sum_{i=0}^{N-1} x(i)x(i+m)$$

Figure 14:
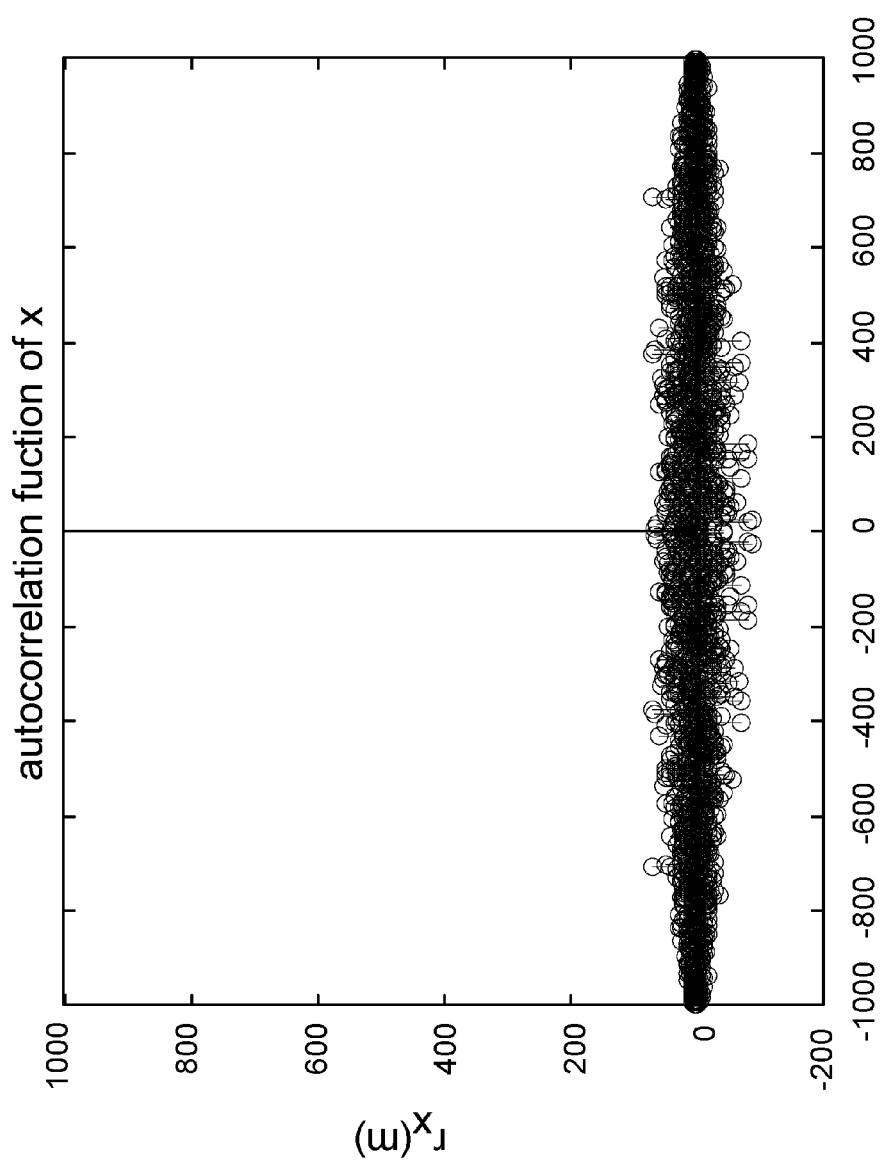
FIG. 14 is a graph of an autocorrelation function.

One important feature of a pseudo random code used here is that the autocorrelation function of a long pseudo random code tends to be a delta function. For example, referring to FIG. 14, considering the autocorrelation function of a pseudo random code having a length of 1000, the autocorrelation function has a very high value at m=0 while being significantly suppressed at other places.

In the following description, several notations are used:
L: the length of channel response;
N: the length of pseudo random code; and
α: the parameter related to the threshold for channel probing.

The received signal y is the convolution result of the pseudo random code x and channel h, as shown in the following equation $$y(n) = \sum_{i=0}^{L} h(i)x(n-i).$$

The cross correlation function $r_{yx}(m)$ defined in the equation below is equivalent to the convolution of autocorrelation of the pseudo random code x and the channel h.

$$r_{yx}(n) = \sum_{i=0}^{N} x(i)y(i+n) = \sum_{i=0}^{L} h(i)r_x(n-i)$$

The following describes an algorithm for synchronization by correlation. The transmitter computes the cross correlation $r_{yx}(m)$, and finds its maximum amplitude $$\text{corr}_{max} = \max |r_{yx}(m)|$$

Based on $\text{corr}_{max}$, the transmitter finds the synchronization index $i_s$ of the received signal y as follows $$i_s = 1;$$

WHILE $|r_{yx}(i_s)| < \alpha \times \text{corr}_{max}$ $$i_s \Leftarrow i_s + 1$$

The parameter a can be selected by experiments, and range from 0 to 1. For example, according to an ultra wide band channel model used in the simulation, the parameter a is chosen to be around 0.2. After obtaining the index $i_s$, the estimated channel response $\tilde{h}$ can be determined by truncating the cross correlation function $r_{yx}(m)$ as follows:

$$\tilde{h} = r_{yx}(i_s: i_s + L - 1)$$

Data Transmission Handshaking

The following describes a handshaking method for the data transmission phase. As discussed above, in the channel probing phase, the purpose of handshaking is to allow the transmitter to obtain the estimated channel response. In the data transmission phase, due to the spatial and time focusing effect of the time-reversal system, the receiver needs to sample the received signal at the right time instant to obtain the correct information. The receiver can use a correlation based method to synchronize to the correct time index, referred to as SYNCID.

Figure 15:
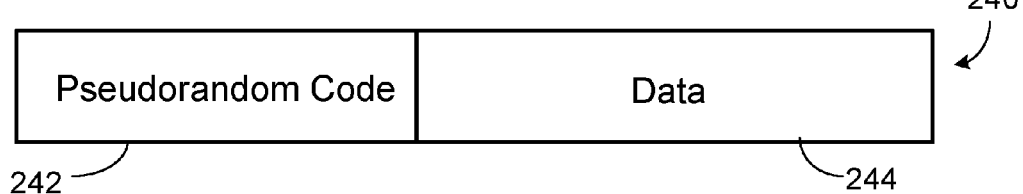
FIG. 15 is a diagram of a frame structure of a time reversal packet.

Referring to FIG. 15, in the data transmission phase, the transmitter sends a time reversal packet, which includes both pseudo random code 242 and data bits 244, in which the pseudo random code is used for synchronization. The receiver becomes synchronized to the packet by implementing the correlation method on the pseudo random code.

Figure 16:
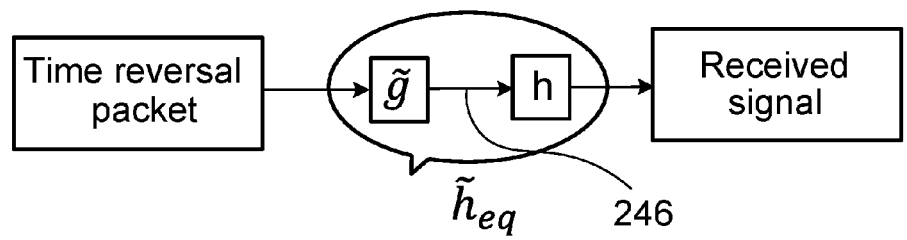
FIG. 16 is a diagram of a data transmission phase.

Referring to FIG. 16, in the data transmission phase, the packet to be transmitted by the transmitter is first convolved with the time-reversal waveform $\tilde{g}$ (also referred to as the signature waveform associated with the receiver) to generate a transmit signal 246, which is then passed through the channel h. The equivalent channel is denoted as $\tilde{h}_{eq}$ which is the convolution of $\tilde{g}$ and h.

Let y denote the received signal at the receiver and x denote the transmitted pseudo random code at the transmitter. The following describes steps for achieving synchronization.

Compute the cross correlation of received signal y and the pseudo random code x.

$$r_{yx}(n) = \sum_{i=0}^{N} x(i)y(i+n)$$

Find the index SYNCID based on the maximum of $r_{yx}(n)$ $$\text{SYNCID} = \text{argmax}_i |r_{yx}(i)|$$

The receiver samples the remainder of the received signal y at index SYNCID+kD in which k=1, 2, ... to obtain the information transmitted by the transmitter. D is the backoff factor of the time reversal system.

Numerical Results

Figure 17:
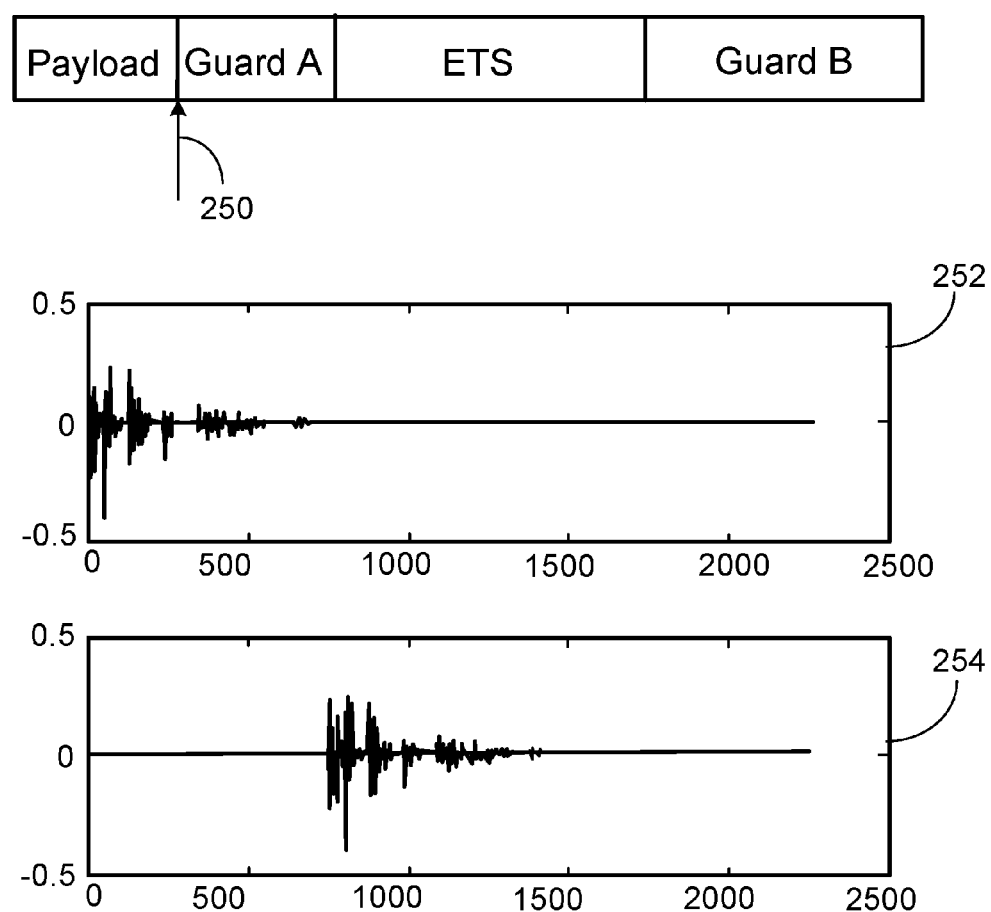
FIGS. 17-19 show graphs of estimated channel responses.
Figure 18:
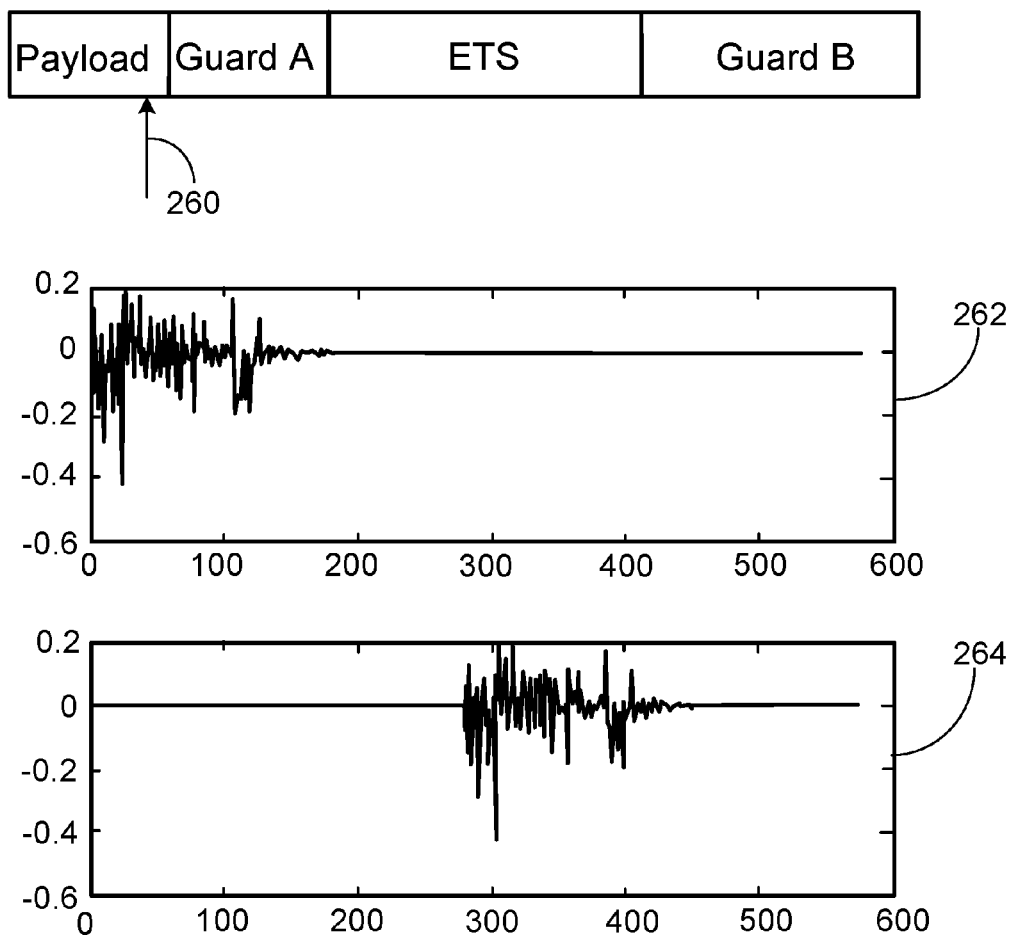
Figure 19:
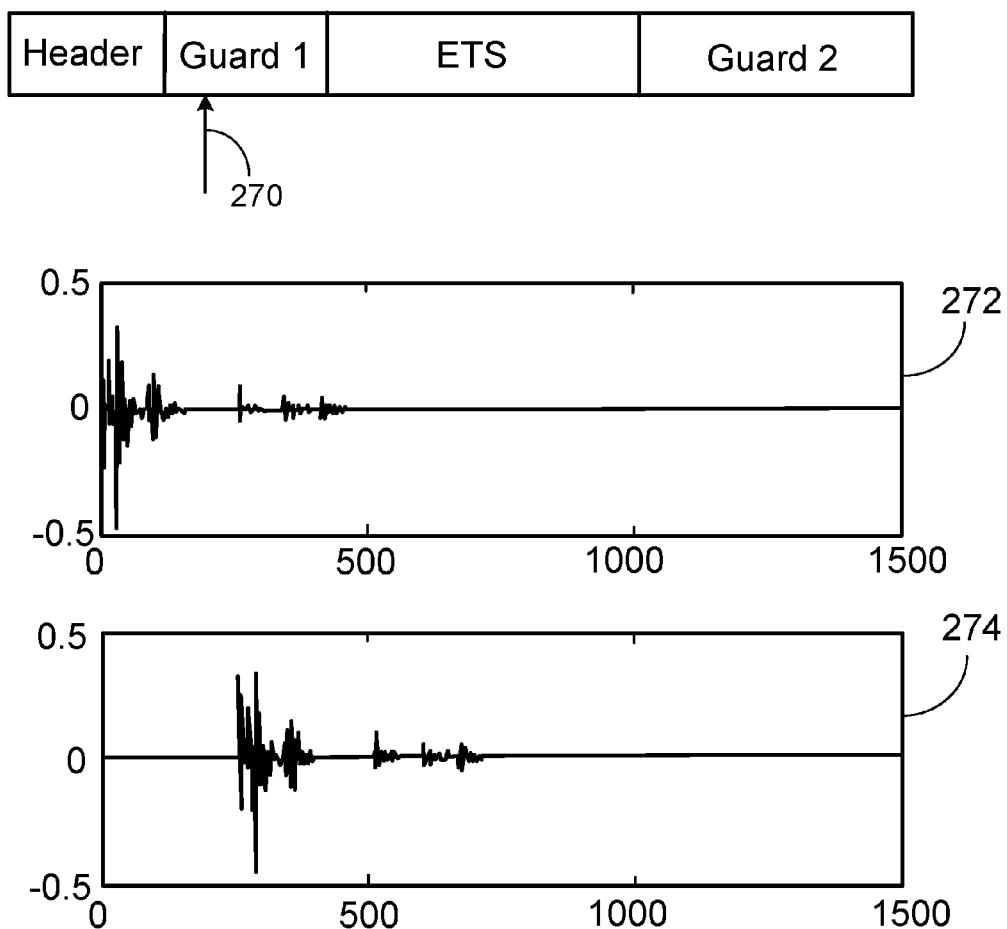

Referring to FIGS. 17 to 19, three instances of the estimated channel response determined using the least square based method are compared with the actual channel response. The length of the guard interval A ($L_a$) and the parameter T are both chosen to be L.

FIG. 17 shows an example in which there is no synchronization error, i.e., the transmitter uses the received signal just from the beginning of the training sequence. An arrow 250 indicates the location where the transmitter is synchronized (i.e., the location where the transmitter considers to be the beginning of the training sequence). A graph 252 shows the actual channel response. A graph 254 shows the estimated channel response. In this case, the effective channel response is at the center of the estimated channel response.

FIG. 18 shows an example in which the transmitter is synchronized ahead of the training sequence. The arrow 260 indicates the location where the transmitter is synchronized (i.e., the location where the transmitter considers to be the beginning of the training sequence). A graph 262 shows the actual channel response. A graph 264 shows the estimated channel response. In this case, the effective channel response is shifted to the rear of the estimated channel response.

FIG. 19 shows an example in which the transmitter is synchronized after the training sequence. The arrow 270 indicates the location where the transmitter is synchronized (i.e., the location where the transmitter considers to be the beginning of the training sequence). In this case, the effective channel response is shifted to the front of the estimated channel response. In the three examples shown in FIGS. 17 to 19, the effective channel response is preserved in the estimated channel response.

Figure 20:
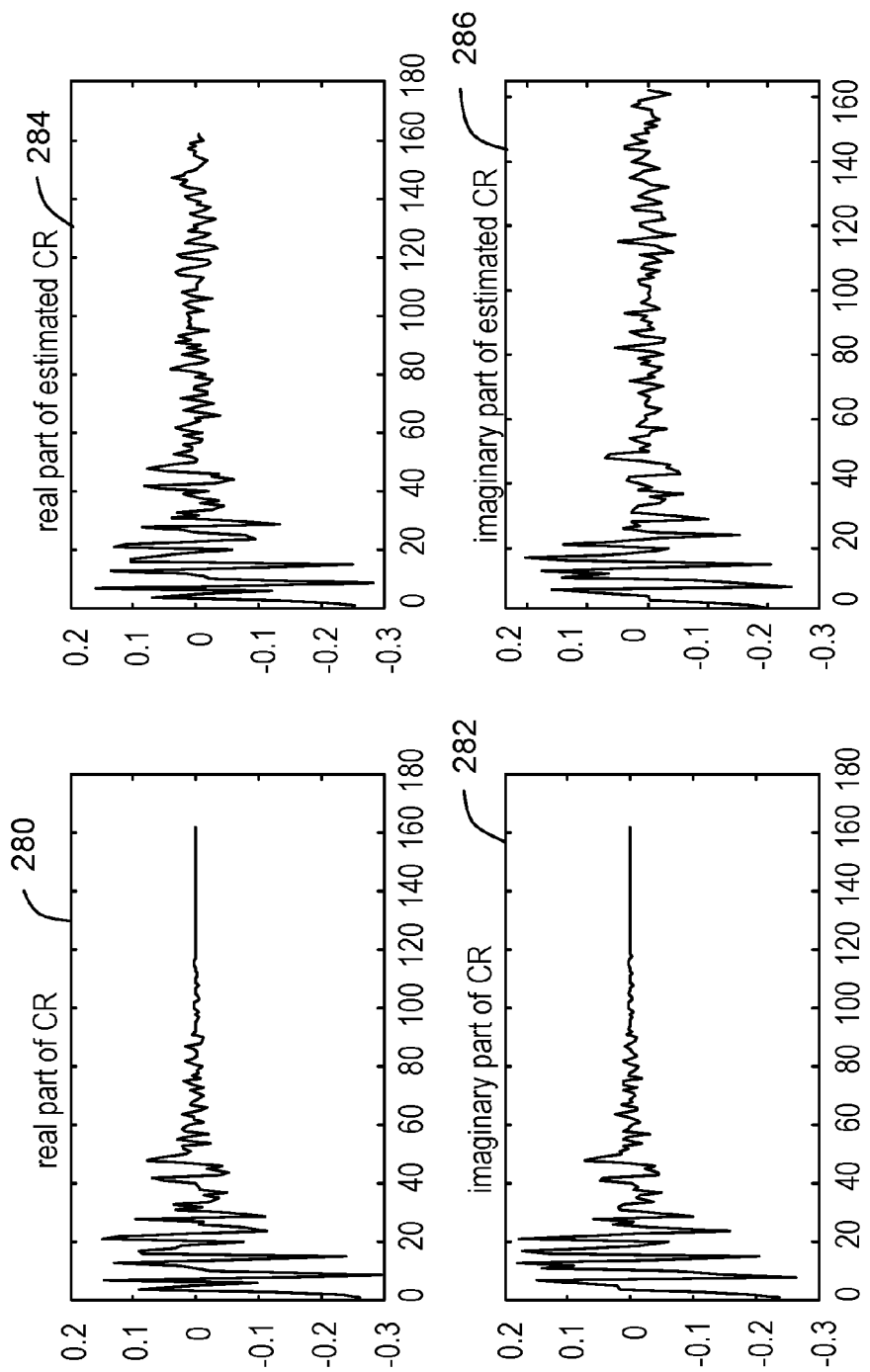
FIG. 20 show graphs of real and imaginary parts of actual and estimated channel responses.

Referring to FIG. 20, a graph 280 shows a waveform for a real part of an actual channel response, and a graph 282 shows a waveform for an imaginary part of the actual channel response. A graph 284 shows a waveform for a real part of an estimated channel response, and a graph 282 shows a waveform for an imaginary part of the estimated channel response. The estimated channel response is determined using the correlation method described above. A comparison of the real part waveforms in graphs 280 and 284, and a comparison of the imaginary part waveforms in graphs 282 and 286 indicate that the estimated channel response determined using the correlation method preserves the information of the actual channel response.

Figure 21:
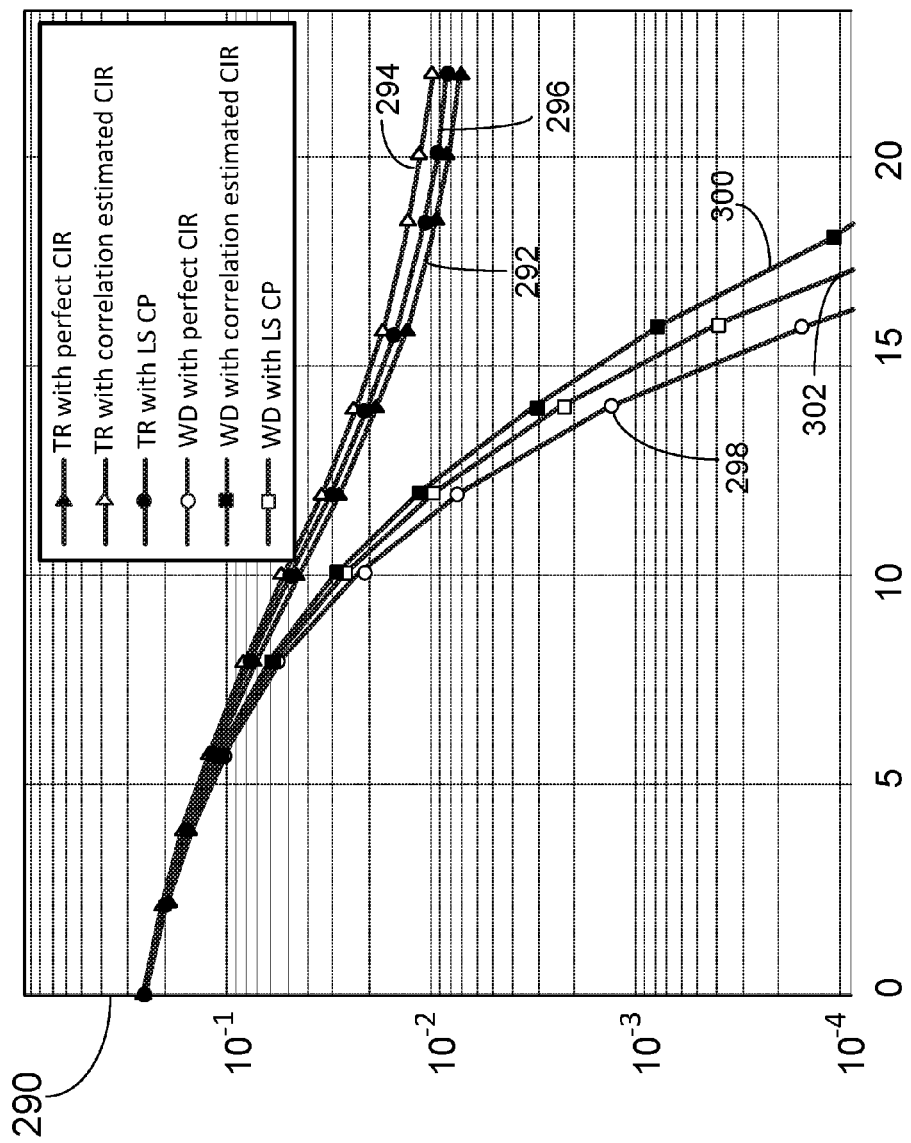
FIG. 21 is a graph showing bit error rate (BER) performances.

Referring to FIG. 21, a graph 290 shows the bit error rate (BER) performances of the time reversal communication system with and without waveform design (WD) using the real channel response and estimated channel response. Waveform design techniques are intended to increase the signal-to-interference-and-noise ratios by carefully allocating power for different downlink signals. Waveform design is described in U.S. patent application Ser. No. 13/706,342, titled "WAVEFORM DESIGN FOR TIME-REVERSAL SYSTEMS," and filed on Dec. 5, 2012, herein incorporated by reference.

A curve 292 shows the bit error rate performance of the time reversal communication system with actual channel impulse response, in which waveform design techniques are not used.

A curve 294 shows the bit error rate performance of the time reversal communication system with channel impulse response estimated using the correlation method, in which waveform design techniques are not used.

A curve 296 shows the bit error rate performance of the time reversal communication system with channel impulse response estimated using the least square method, in which waveform design techniques are not used. The closeness of the curves 292, 294, and 296 indicate that the correlation method and the least square method provide good bit error rate performances that are comparable to the system that uses actual channel impulse response when waveform design techniques are not used.

A curve 298 shows the bit error rate performance of the time reversal communication system with actual channel impulse response, in which waveform design techniques are used.

A curve 300 shows the bit error rate performance of the time reversal communication system with channel impulse response estimated using the correlation method, in which waveform design techniques are used.

A curve 302 shows the bit error rate performance of the time reversal communication system with channel impulse response estimated using the least square method, in which waveform design techniques are used. The closeness of the curves 298, 300, and 302 indicate that the correlation method and the least square method also provide good bit error rate performances that are comparable to the system that uses the actual channel impulse response when waveform design techniques are used.

Figure 22:
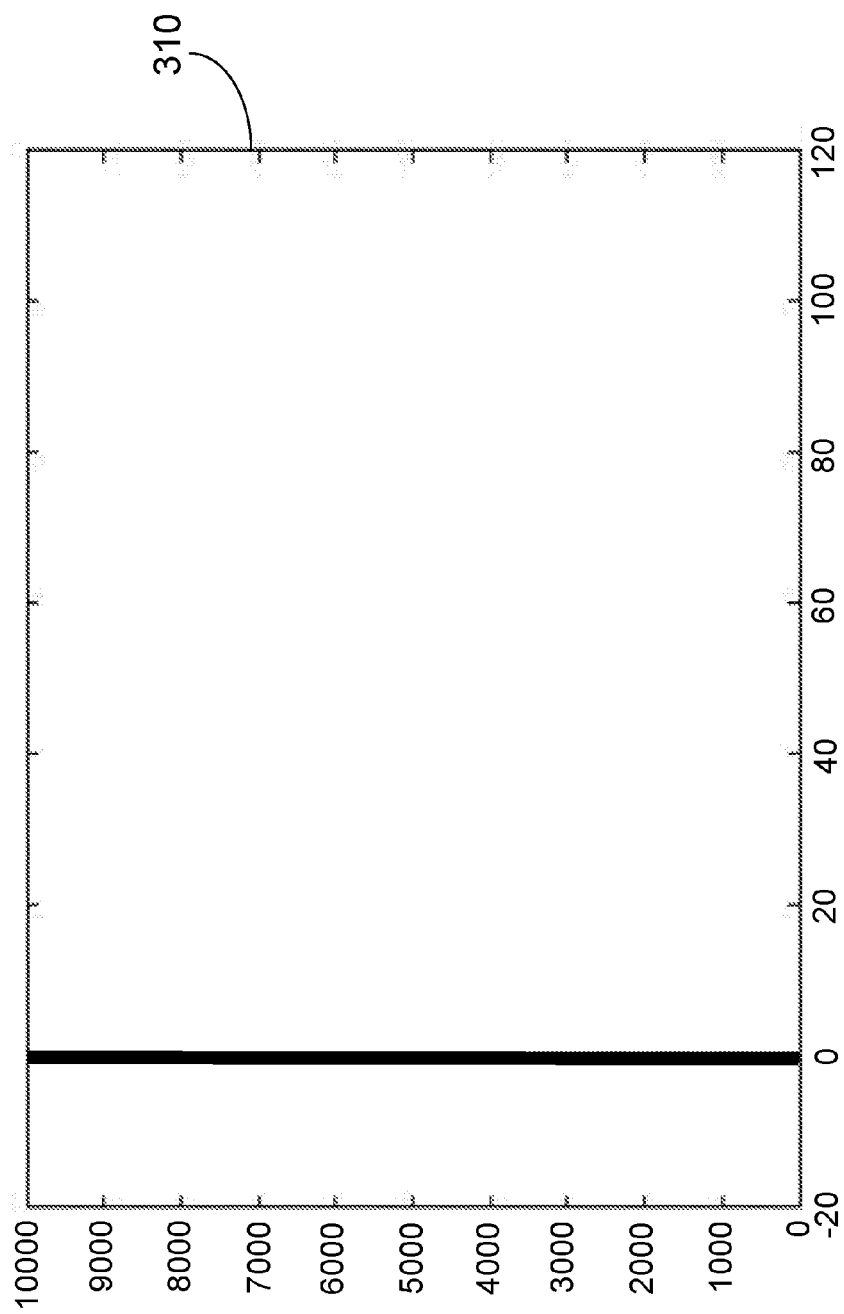
FIG. 22 is a graph showing a histogram of mismatch for synchronization.

Referring to FIG. 22, a graph 310 shows the histogram of mismatch for synchronization using the correlation method in the data transmission phase. In this example, the pseudo random code length N=60 and the signal-to-noise ratio SNR=0 dB. The graph 310 shows that the synchronization is very accurate for 10,000 cases, even though the pseudo random code length N=60 is relatively short.

Figure 23:
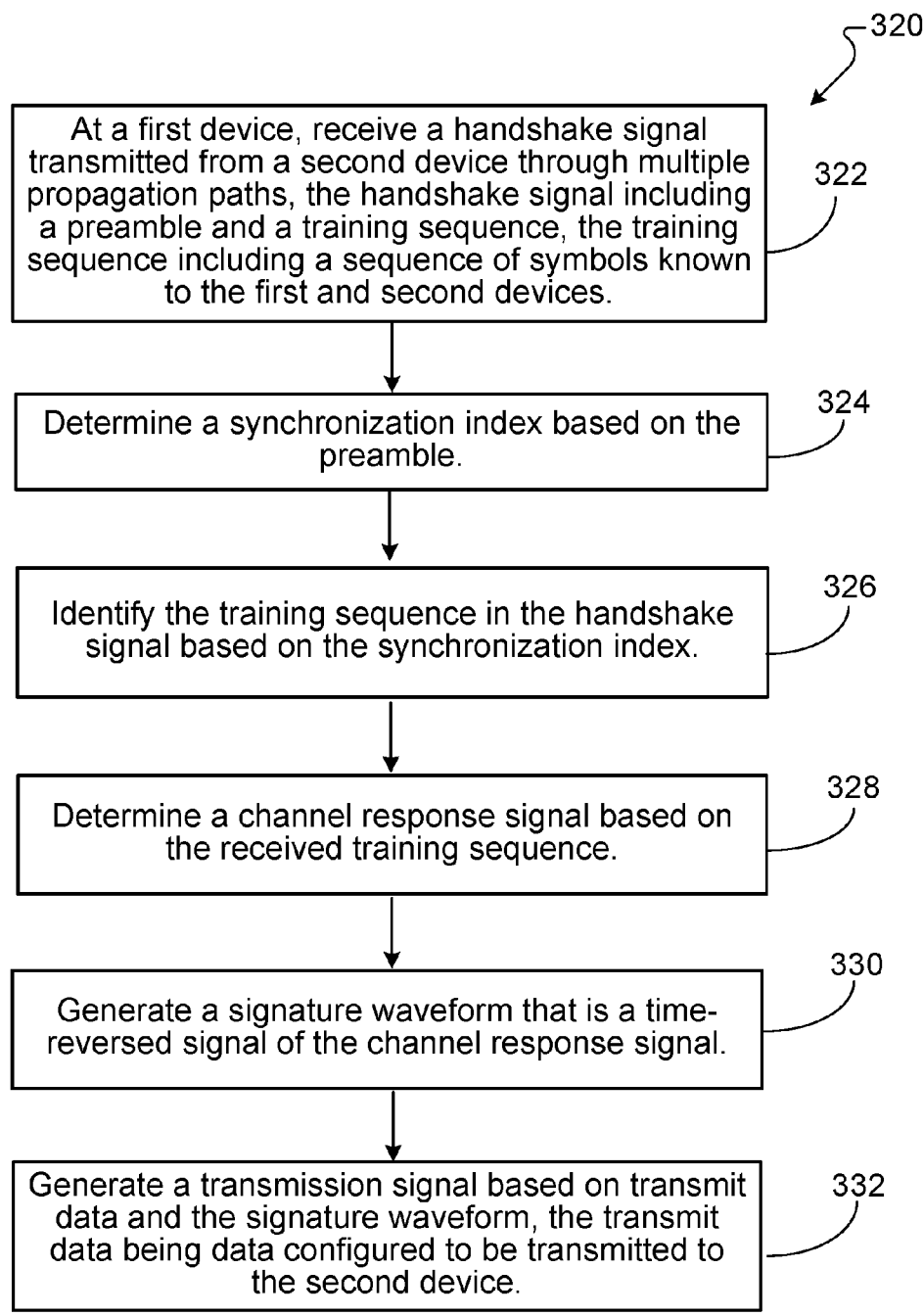
FIGS. 23-26 are flow diagrams of processes for time-reversal wireless communication.

FIG. 23 is a flow diagram of a process 320 for time-reversal wireless communication using a handshaking procedure to provide accurate timing synchronization between devices. For example, the process 320 can be implemented by the base station 152 of FIG. 4. The process 320 includes at a first device, receiving a handshake signal transmitted from a second device through multiple propagation paths, the handshake signal including a preamble and a training sequence, the training sequence including a sequence of symbols known to the first and second devices (322). For example, the first device can be the base station 152, and the second device can be the terminal 154.

The process 320 includes determining a synchronization index based on the preamble (324), and identifying the training sequence in the handshake signal based on the synchronization index (326). For example, the preamble can be the preamble 192 of FIG. 7, the synchronization index can be the synchronization index $i_s$ described above, and the training sequence can be the training sequence 198.

The process 320 includes determining a channel response signal based on the received training sequence (328), generating a signature waveform that is a time-reversed signal of the channel response signal (330), and generating a transmission signal based on transmit data and the signature waveform, the transmit data being data configured to be transmitted to the second device (332). For example, the signature waveform can be the signature waveform g(t) 188 shown in FIG. 6.

Figure 24:
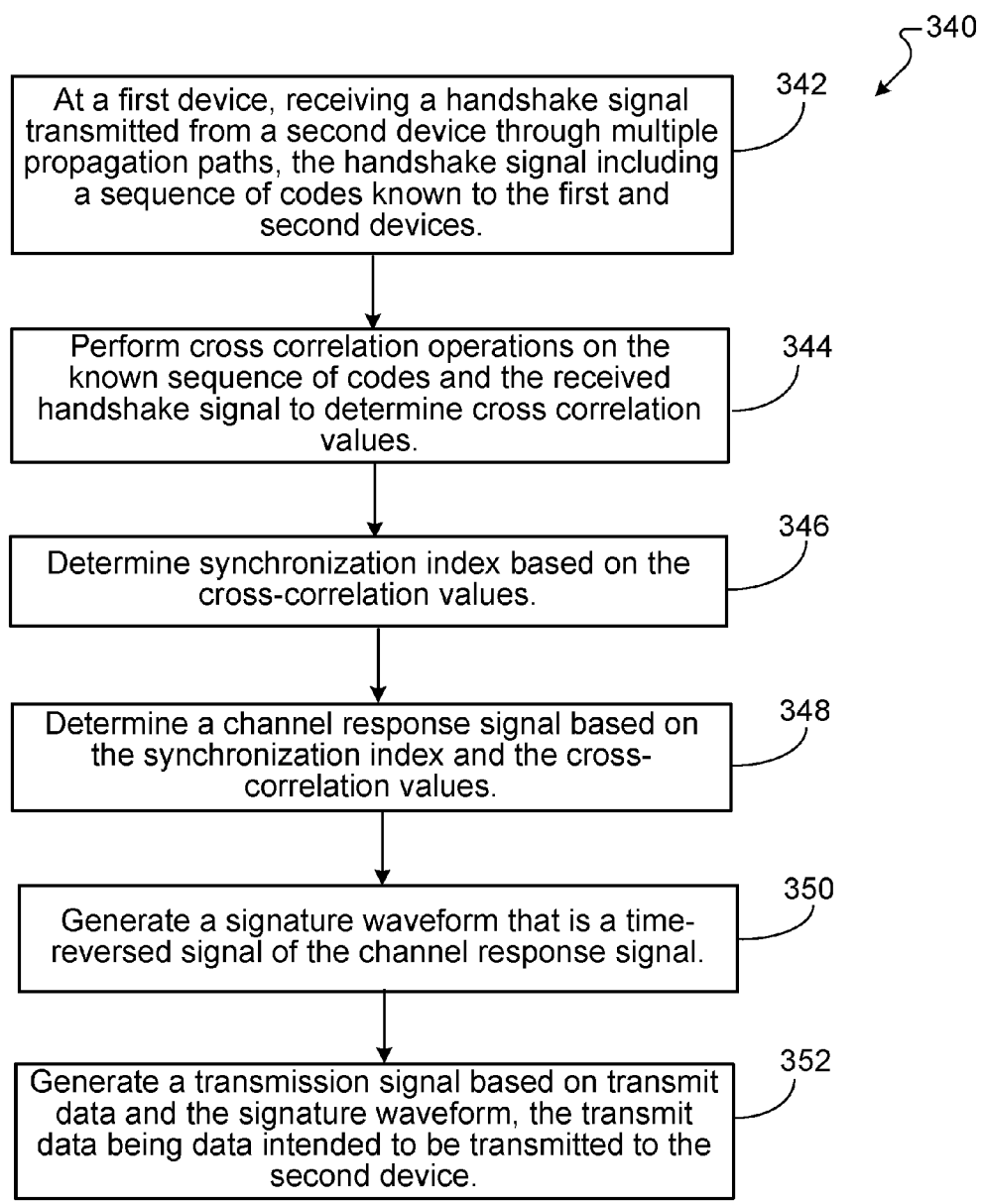

FIG. 24 is a flow diagram of a process 340 for time-reversal wireless communication using a handshaking procedure to provide accurate timing synchronization between devices. For example, the process 320 can be implemented by the base station 152 of FIG. 4. The process 320 includes at a first device, receiving a handshake signal transmitted from a second device through multiple propagation paths, the handshake signal including a sequence of codes known to the first and second devices (342). For example, the first device can be the base station 152, and the second device can be the terminal 154.

The process 340 includes performing cross correlation operations on the known sequence of codes and the received handshake signal to determine cross correlation values (344), and determining synchronization index based on the cross correlation values (346). For example, the cross correlation values can be the cross correlation $r_{yx}(m)$ and the synchronization index can be the synchronization index $i_s$ described above.

The process 340 includes determining a channel response signal based on the synchronization index and the cross correlation values (348), generating a signature waveform that is a time-reversed signal of the channel response signal (350), and generating a transmission signal based on transmit data and the signature waveform, the transmit data being data intended to be transmitted to the second device (352). For example, the channel response can be the channel response $\tilde{h}$ described above, and the signature waveform can be the signature waveform g(t) 188 shown in FIG. 6.

Figure 25:
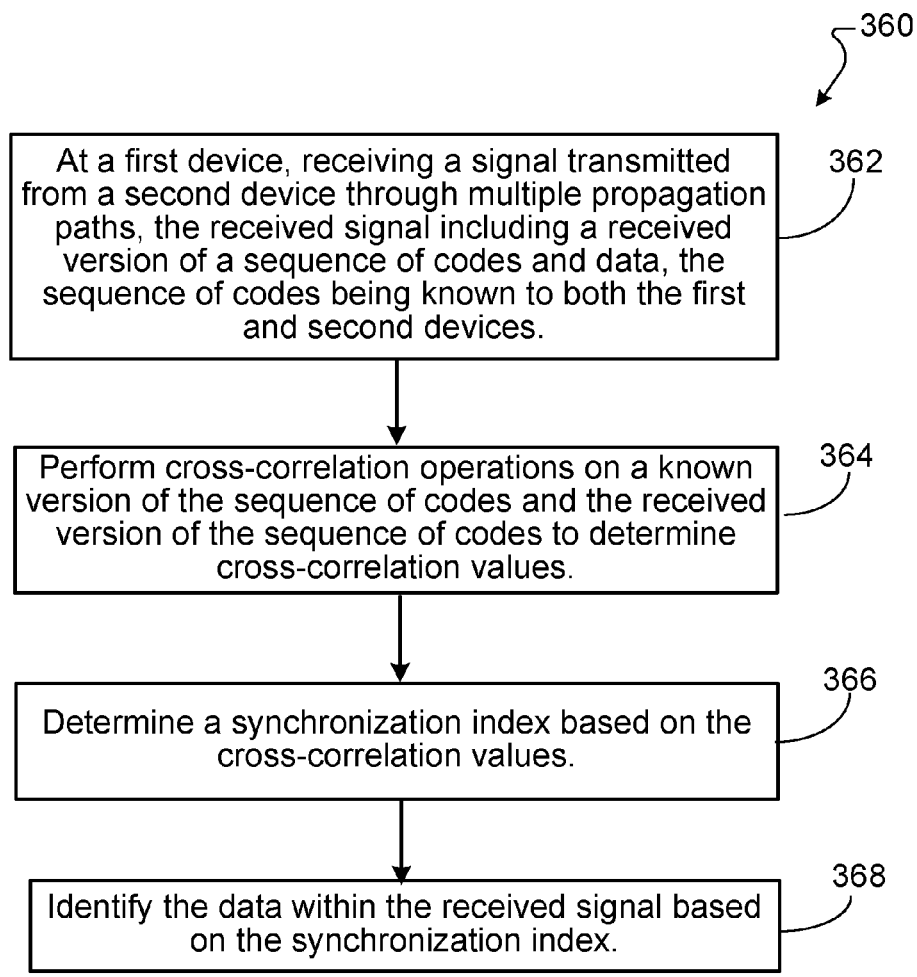

FIG. 25 is a flow diagram of a process 360 for time-reversal wireless communication between devices. For example, the process 360 can be implemented by the base station 152 of FIG. 4. The process 360 includes at a first device, receiving a signal transmitted from a second device through multiple propagation paths, the received signal including a received version of a sequence of codes and data, the sequence of codes being known to both the first and second devices (362). For example, the first device can be the base station 152, and the second device can be the terminal 154.

The process 360 includes performing cross correlation operations on a known version of the sequence of codes and the received version of the sequence of codes to determine cross correlation values (364), determining a synchronization index based on the cross correlation values (366), and identifying the data within the received signal based on the synchronization index (368). For example, the cross correlation values can be the cross correlation $r_{yx}(m)$ and the synchronization index can be the synchronization index $i_s$ described above.

Figure 26:
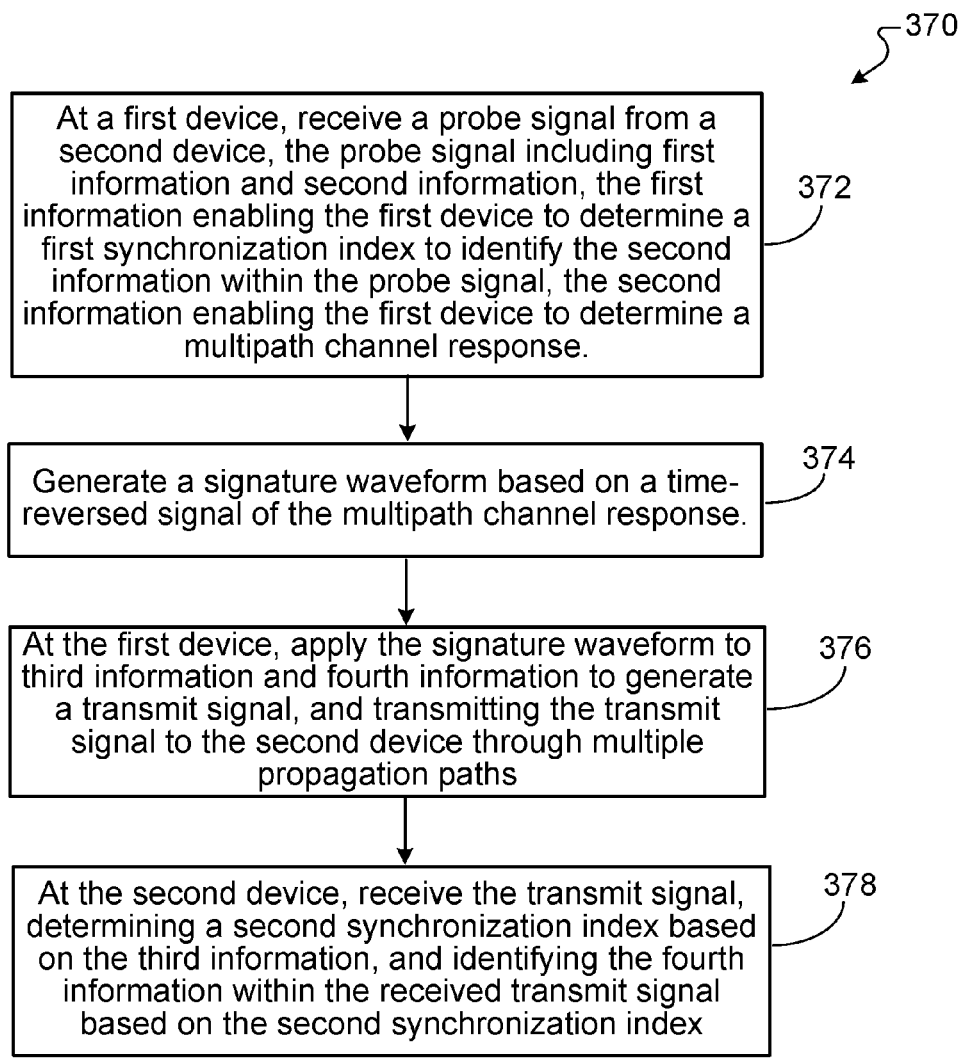

FIG. 26 is a flow diagram of a process 370 for time-reversal wireless communication between devices. For example, the process 370 can be implemented by the base station 152 and the terminal device 154 of FIG. 4. The process 370 includes at a first device, receiving a probe signal from a second device, the probe signal including first information and second information, the first information enabling the first device to determine a first synchronization index to identify the second information within the probe signal, the second information enabling the first device to determine a multipath channel response (372). For example, the first device can be the base station 152, the second device can be the terminal 154, and the first synchronization index can be the synchronization index $i_s$ described above.

The process 370 includes generating a signature waveform based on a time-reversed signal of the multipath channel response (374). For example, the signature waveform can be the signature waveform g shown in FIG. 16.

The process 370 includes at the first device, applying the signature waveform to third information and fourth information to generate a transmit signal, and transmitting the transmit signal to the second device through multiple propagation paths (376). For example, the third information can be the pseudo random code 242 (FIG. 15), the fourth information can be the data bits 244, and the transmit signal can be the transmit signal 246.

The process 370 includes at the second device, receiving the transmit signal, determining a second synchronization index based on the third information, and identifying the fourth information within the received transmit signal based on the second synchronization index (378). For example, the second synchronization index can be the index SYNCID described above.

In some implementations, a device may have a first communication module that uses time-reversal division multiple access technology and a second communication module that uses another communications protocol, such as Wi-Fi or Bluetooth. The device may switch between different communication modes based on predetermined criteria. For example, a group of drones may communicate among one another using Wi-Fi when flying in outdoor wide open areas where reflected signals are weak, and switch to time-reversal division multiple access technology when flying indoors or in areas with dense buildings where reflected signals are strong. For example, the drones may use time-reversal division multiple access technology when flying below a threshold speed so that the positions of the drones are relatively stable between hand-shakes. When the drones fly above the threshold speed, the drones may move considerable distances during the time period between hand-shakes such that the signature waveforms obtained during the hand-shaking process may not be appropriate when the actual data is transmitted a short time period later. The drones may switch to using Wi-Fi or Bluetooth when flying above the threshold speed. For example, the drones may use time-reversal division multiple access technology when the required data transmission rate is below a threshold, such as when transmitting positioning or status data. The drones may switch to Wi-Fi or Bluetooth when the required data transmission rate is above the threshold, such as when transmitting imaging or video data.

In some implementations, the waveforms sent from the base station 152 to the terminals 154 can be designed to optimize sum rate by suppressing inter-symbol interference and inter-user interference, as described in U.S. patent application Ser. No. 13/706,342, filed on Dec. 5, 2012, titled "Waveform Design for Time-Reversal Systems," herein incorporated by reference in its entirety. For example, the base station 152 may receive channel response signals derived from probe signals sent from terminal devices 154, in which each probe signal is sent from one of the terminal devices 154 to the base station 152 through multiple propagation paths. The probe signals may be sent during the channel probing phase 170 (FIG. 5). The base station 152 may determine downlink waveforms for the terminal devices 154 to increase a weighted sum-rate under a total power constraint, in which the downlink waveforms are determined based on time-reversed channel response signals and initial virtual uplink power allocation coefficients. The base station 152 may determine updated virtual uplink power allocation coefficients based on the downlink waveforms, and determine downlink power allocation coefficients based on the downlink waveforms and the virtual uplink power allocation coefficients.

The base station 152 may determine virtual uplink signal-to-interference-and-noise ratios (SINRs) based on the virtual uplink power allocation coefficients, and determine the downlink power allocation coefficients based on the virtual uplink SINRs. The virtual uplink SINRs may take into account both inter-symbol interference (ISI) and inter-user interference (IUI). Increasing the weighted sum-rate may also reduce a combination of the inter-symbol interference and the inter-user interference. The base station 152 may transmit a downlink signal derived from a combination of the downlink waveforms and take into account the downlink power allocation coefficients, in which the downlink signal is transmitted to each of the terminal devices 154 through multiple propagation paths. The downlink signal can be configured to enable each terminal device 154 to receive multipath signals that can be used determine a data signal intended for the terminal device 154, in which different terminal devices 154 receive the downlink signal through different propagation paths and determine different data signals, and in which the downlink signal is configured to reduce inter-symbol interference (ISI) and inter-user interference (IUI) for the data signals determined at the terminal devices 154. The base station 152 may determine the downlink waveforms and the virtual uplink power allocation coefficients by iteratively determining updated downlink waveforms based on previously determined virtual uplink power allocation coefficients, and determining updated virtual uplink power allocation coefficients based on previously determined downlink waveforms. The base station 152 may determine downlink waveforms by determining downlink waveforms to maximize the weighted sum-rate under the total power constraint. The base station 152 may determine downlink waveforms by determining minimum mean squared error (MMSE) waveforms.

In some implementations, the complexities of the base station 152 and the terminal devices 154 are asymmetric, such that the base station 152 performs most of the signal processing as both a transmitter (for the downlink) and receiver (for the uplink), allowing the use of low complexity terminal devices 154, as described in U.S. patent application Ser. No. 13/969,271, filed on Aug. 16, 2013, titled "Time-Reversal Wireless Systems Having Asymmetric Architecture," herein incorporated by reference in its entirety.

In some implementations, the multi-user time reversal communication system 150 can use a two-dimensional parallel interference cancellation scheme to enhance the system performance, as described in U.S. patent application Ser. No. 13/969,320, filed on Aug. 16, 2013, titled "Multiuser Time-Reversal Divisional Multiple Access Uplink System with Parallel Interference Cancellation," herein incorporated by reference in its entirety. The two-dimensional parallel interference cancellation scheme uses tentative decisions of detected symbols to effectively cancel the interference in both the time dimension (inter-symbol interference) and the user dimension (inter-user interference), which significantly improves the bit-error-rate performance to achieve a high signal-to-noise-ratio. To further improve the bit error rate performance, a multi-stage processing can be implemented by cascading multiple stages of the proposed two-dimensional interference cancellation, with a total delay that increases linearly with the number of stages, but independent of the number of users.

In some implementations, the hand-shaking between the base station 152 and the terminal devices 154 may be performed dynamically depending on various criteria. For example, if the base station 152 and the terminal devices 154 are stationary, the hand-shaking may occur less frequently, and if the base station 152 and/or the terminal devices 154 are moving, the time period between hand-shaking may depend on the speed of movement. For example, the terminal device 154 may provide information to the base station 152 about what type of device the terminal device 154 is, such as whether it is a device that is typically fixed in place (e.g., a refrigerator) or will move around (e.g., a cell phone). For terminal devices that move, the terminal devices may provide information about the speed of movement to the base station during the hand-shaking process. The hand-shaking between the base station and fast-moving terminal devices may occur more frequently, whereas the hand-shaking between the base station and slow-moving terminal devices may occur less frequently. The base station may have a table that records information about the speed of movement of the terminal devices, in which the information in the table is used to determine the time period between hand-shaking with the terminal devices. In some examples, terminal devices can be assigned a category, and the time periods between handshaking may be different for different categories. For example, the base station and the terminal devices may follow protocol in which each terminal device is assigned one of several categories, and each category is assigned a time period between hand-shaking. For example, a first category of devices can be primarily stationary (e.g., a refrigerator), and the hand-shaking between the base station and the first category of devices may occur every n1 milliseconds. A second category of devices can be fast-moving (e.g., vehicles or drones), and the hand-shaking between the base station and second category of devices may occur every n2 milliseconds, in which $n2 < n1$.

For example, the hand-shaking between the base station 152 and the terminal devices 154 may be performed dynamically depending on information about an environment of the base station and the terminal devices. Changes in the environment may affect the wireless communication channels. For example, the channel between two stationary devices in an airport terminal may change frequently because of movements of people, luggage, and carts in the terminal. A motion sensor may monitor the environment and the information on the amount of movements in the environment may be provided to the base station 152.

For example, the base station may store information about the category of the environment, such as whether the environment is a conference room, a residence, a school classroom, a hallway, a mall, a grocery store, an airport terminal, or a train station. Different types of environments may be assigned different handshaking intervals. For example, the base station may store information about how the environment changes throughout the day, week, or month. Within a home, there may be more activity during the morning and evening, so the handshaking process may be performed more frequently. During the hours where there are fewer movements in the house, the handshaking process may be performed less frequently. For example, an intelligent thermostat in a house may have sensors that monitor movements within the house in order to determine the appropriate temperature level. The intelligent thermostat may send information about movements in the house to the base station so that the base station may use the information to determine the handshake interval.

In some implementations, the base station 152 may determine the handshaking frequency by analyzing the channel measured at the base station without using information on the speed of movements of the base station and terminal devices, or information about the environment. For example, during a first period of time, the base station may perform frequent handshaking (in which the handshaking interval is short) and determine the longest interval between handshaking for which the channel remains relatively stable. The base station may determine the channel response based on the training sequence, and evaluate the stability of the channel based on the similarity between channel responses. During a second period of time, the base station performs handshaking based on the longest interval (for which the channel remains relatively stable) determined during the first period of time. During a third period of time, the base station performs frequent handshaking and determines the longest interval (for which the channel remains relatively stable) between handshaking in which the channel remains relatively stable. During a fourth period of time, the base station performs handshaking based on the longest interval (for which the channel remains relatively stable) determined during the third period of time, and so forth. In some implementations, if the channel response similarity between consecutive handshaking processes is low, the system reverts back to a previous shorter handshaking interval.

In some implementations, the base station 152 may determine the handshaking frequency based on a quality of service measure, such as the bit error rate. The base station may start with an initial handshaking interval, measure the error rate, then either increase or decrease the handshaking interval to identify the longest handshaking interval that provides an acceptable bit error rate. The base station may perform tests periodically to determine the longest handshaking interval that provides a bit error rate below a predetermined threshold.

In some implementations, the base station 152 can be part of a mobile or stationary device. For example, the base station 152 can be implemented as part of a sensor module, a controller, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The base station 152 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the frame structure of the channel probing signal, the format for the preamble 192, barker code 194, payload 196, and the training sequence 198 can be different from those described above. The base station 152 and terminal devices 154 can include more components that are not shown in the figures. For example, standard components such as analog-to-digital converters, digital-to-analog converters, and power amplifiers have been omitted from the figures.

Accordingly, other embodiments are within the scope of the following claims.

What is claimed is:

1. A method comprising:
   at a first device, receiving a handshake signal transmitted from a second device through multiple propagation paths, the handshake signal including a preamble and a training sequence, the training sequence including a sequence of symbols known to the first and second devices;
   determining a synchronization index based on the preamble;
   identifying the training sequence in the handshake signal based on the synchronization index;
   determining a channel response signal based on the received training sequence;
   generating a signature waveform that is a time-reversed signal of the channel response signal; and
   generating a transmission signal based on transmit data and the signature waveform, the transmit data being data configured to be transmitted to the second device
   in which determining a channel response comprises calculating $\widehat{CR} = C_q u$, in which $\widehat{CR}$ represents an estimated channel response, $C_q$ represents a conversion matrix, and u represents a portion of the received handshake signal that is estimated to be the received training sequence;
   in which the conversion matrix $C_q$ is determined by calculating $C_q = (T^* T)^{-1} T^*_s$ in which T is a Toeplitz matrix generated based on $s_q$, which represents an effective training sequence sent by the second device.

2. The method of claim 1 in which the handshake signal comprises a first predetermined code.

3. The method of claim 2 in which the first predetermined code comprises a barker code.

4. The method of claim 2 in which the handshake signal comprises a second predetermined code that includes an index for selecting the training sequence from among a list of training sequences.

5. The method of claim 1 in which the preamble comprises pulse signals.

6. The method of claim 1 in which determining a channel response signal comprises determining a channel response signal based on a conversion matrix and the training sequence.

7. The method of claim 6 in which the conversion matrix is constructed based on the training sequence sent by the second device.

8. The method of claim 1 in which determining a channel response signal comprises determining a channel response signal based on a least square method.

9. The method of claim 1, comprising applying time windows to the received training sequence and determining an estimated channel response based on averaging the samples in the time windows.

10. The method of claim 1, comprising applying time windows to the received preamble to determine the synchronization index.

11. The method of claim 1 in which the training sequence comprises a first guard band, followed by an effective training sequence, which is followed by a second guard band.

12. The method of claim 1 in which generating a signature waveform comprises generating a signature waveform that is a time-reversed conjugate signal of the channel response signal.

13. A system comprising:
a first device comprising:
    an input circuit configured to receive a handshake signal transmitted wirelessly from a second device through multiple propagation paths, the handshake signal including a preamble and a training sequence, the training sequence including a sequence of symbols known to the first and second devices; and
a data processor configured to:
    determine a synchronization index based on the preamble;
    identify the training sequence in the handshake signal based on the synchronization index;
    determine a channel response signal based on the received training sequence;
    generate a signature waveform that is a time-reversed signal of the channel response signal; and
    generate a transmission signal based on transmit data and the signature waveform, the transmit data being data configured to be transmitted to the second device
in which the data processor is configured to determine a channel response by calculating $\widehat{CR} = Cq\ u$, in which $\widehat{CR}$ represents an estimated channel response, Cq represents a conversion matrix, and u represents a portion of the received handshake signal that is estimated to be the received training sequence;
in which the conversion matrix Cq is determined by calculating $Cq = (T'T)^{-1} T'$ in which T is a Toeplitz matrix generated based on $s_q$, which represents an effective training sequence sent by the second device.

14. The apparatus of claim 13 in which the handshake signal comprises a first predetermined code.

15. The apparatus of claim 14 in which the first predetermined code comprises a barker code.

16. The apparatus of claim 14 in which the handshake signal comprises a second predetermined code that includes an index for selecting the training sequence from among a list of training sequences.

17. The apparatus of claim 13 in which the preamble comprises pulse signals.

18. The apparatus of claim 13 in which the data processor is configured to determine a channel response signal based on a conversion matrix and the training sequence.

19. The apparatus of claim 18 in which the conversion matrix is constructed based on the training sequence sent by the second device.

20. The apparatus of claim 13 in which the data processor is configured to determine a channel response signal based on a least square method.

21. The apparatus of claim 13, in which the data processor is configured to apply time windows to the received training sequence and determine an estimated channel response based on averaging the samples in the time windows.

22. The apparatus of claim 13, in which the data processor is configured to apply time windows to the received preamble to determine the synchronization index.

23. The apparatus of claim 13 in which the training sequence comprises a first guard band, followed by an effective training sequence, which is followed by a second guard band.

24. The apparatus of claim 13 in which the data processor is configured to generate a signature waveform that is a time-reversed conjugate signal of the channel response signal.

* * * * *